(12) United States Patent
Yoshimoto et al.

(10) Patent No.: US 9,713,123 B2
(45) Date of Patent: Jul. 18, 2017

(54) BASE STATION DEVICE, MOBILE STATION DEVICE, COMMUNICATION SYSTEM, TRANSMISSION METHOD, RECEPTION METHOD, AND COMMUNICATION METHOD

(75) Inventors: Takashi Yoshimoto, Osaka (JP); Kazuyuki Shimezawa, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 116 days.

(21) Appl. No.: 13/984,201

(22) PCT Filed: Feb. 3, 2012

(86) PCT No.: PCT/JP2012/052490
§ 371 (c)(1),
(2), (4) Date: Aug. 7, 2013

(87) PCT Pub. No.: WO2012/108349
PCT Pub. Date: Aug. 16, 2012

(65) Prior Publication Data
US 2013/0315191 A1    Nov. 28, 2013

(30) Foreign Application Priority Data
Feb. 10, 2011   (JP) .................................. 2011-027076

(51) Int. Cl.
*H04W 28/04* (2009.01)
*H04W 72/00* (2009.01)
(Continued)

(52) U.S. Cl.
CPC ....... *H04W 72/005* (2013.01); *H04J 11/0053* (2013.01); *H04J 11/0056* (2013.01); *H04W 72/042* (2013.01)

(58) Field of Classification Search
CPC . H04W 72/00; H04W 72/005; H04W 72/042; H04W 72/082; H04W 72/04;
(Continued)

(56) References Cited

U.S. PATENT DOCUMENTS

2009/0252077 A1* 10/2009 Khandekar ......... H04W 72/082
                                                              370/312
2010/0056217 A1*  3/2010 Montojo ............... H04W 28/18
                                                              455/562.1

(Continued)

FOREIGN PATENT DOCUMENTS

CN        101932100 A    12/2010
EP        2 343 942 A1    7/2011
(Continued)

OTHER PUBLICATIONS

"Discussion on the O&M Parameters requirement for Macro-Femto Case", 3GPP TSG-RAN WG3 Meeting #70 R3-103244, Nov. 15-19, 2010, pp. 1-2.
(Continued)

*Primary Examiner* — Andrew Chriss
*Assistant Examiner* — Rasha Fayed
(74) *Attorney, Agent, or Firm* — Keating & Bennett, LLP

(57) ABSTRACT

Inter-cell Interference is efficiently mitigated or suppressed in a radio communication system constituting a heterogeneous network. In the radio communication system in which a base station device and a mobile station device communicate with each other, the base station device notifies, to the mobile station device, control information related to a cell-specific reference signal that is specific to a cell ID of another base station device different from the aforesaid base station device, the control information containing information regarding number of ports for the cell-specific reference signal.

24 Claims, 17 Drawing Sheets

(51) Int. Cl.
*H04J 11/00* (2006.01)
*H04W 72/04* (2009.01)

(58) Field of Classification Search
CPC ... H04W 4/00; H04W 52/143; H04W 52/325; H04W 52/244; H04L 5/0051; H04L 5/0023; H04L 5/0057; H04L 5/005; H04L 5/0048; H04L 5/0035; H04L 5/0091; H04L 1/0002; H04L 1/0026
USPC ..... 370/329, 535, 341, 208, 312; 455/422.1, 455/450, 452.2, 561; 375/260
See application file for complete search history.

(56) References Cited

U.S. PATENT DOCUMENTS

| | | | |
|---|---|---|---|
| 2010/0246376 A1* | 9/2010 | Nam | H04L 5/0051 370/208 |
| 2010/0271965 A1* | 10/2010 | Siomina | H04L 5/0048 370/252 |
| 2011/0170496 A1* | 7/2011 | Fong | H04L 5/0053 370/329 |
| 2011/0199986 A1* | 8/2011 | Fong | H04L 5/0035 370/329 |
| 2011/0299449 A1* | 12/2011 | kwon | H04L 5/0023 370/312 |
| 2012/0106374 A1* | 5/2012 | Gaal | H04L 5/0048 370/252 |
| 2012/0115485 A1* | 5/2012 | Narasimha | H04W 68/02 455/437 |
| 2012/0122472 A1* | 5/2012 | Krishnamurthy | H04L 5/0053 455/456.1 |
| 2013/0114496 A1* | 5/2013 | Mazzarese | H04L 5/0023 370/312 |
| 2013/0287064 A1* | 10/2013 | Seo | H04J 13/18 375/144 |

FOREIGN PATENT DOCUMENTS

| | | |
|---|---|---|
| WO | 2010/019019 A2 | 2/2010 |
| WO | 2010/025268 A1 | 3/2010 |
| WO | 2010/032791 A1 | 3/2010 |
| WO | 2010/062238 A1 | 6/2010 |

OTHER PUBLICATIONS

"Consideration on Available and Further Techniques for CRS Interference Mitigation", 3GPP TSG RAN WG1 Meeting #63 R1-105936, Nov. 15-19, 2010, pp. 1-6.
Official Communication issued in International Patent Application No. PCT/JP2012/052490, mailed on Apr. 24, 2012.
3GPP TR 36.814 V9.0.0, 3rd Generation Partnership Project; Technical Specification Group Radio Access Network; Evolved Universal Terrestrial Radio Access (E-UTRA); Further advancements for E-UTRA physical layer aspects (Release 9), Mar. 2010, pp. 1-104.
3GPP TSG-RAN1#67, "LS on feICIC", Release 11, URL: http://www.3gpp.org/ftp/tsg_ran/GW1/TSGR1_67/Docs/R1-114468.zip., Nov. 14-18, 2011, 1 page.

* cited by examiner

FIG.14

| INFORMATION REGARDING SUBFRAMES SUBJECTED TO CANCELLATION PROCESS | | | | | | | | | | CELL INFORMATION AREA | | | | | | | | NUMBER OF LAYERS | | | | |
|---|---|---|---|---|---|---|---|---|---|---|---|---|---|---|---|---|---|---|---|---|---|---|
| 0 | 1 | 2 | 3 | 4 | 5 | 6 | 7 | 8 | 9 | 0 | 1 | 2 | 3 | 4 | 5 | 6 | 7 | 0 | 1 | 2 | 3 | ... |
| 1 | 0 | 0 | 0 | 0 | 1 | 1 | 0 | 0 | 0 | 1 | 0 | 0 | 0 | 0 | 0 | 0 | 0 | 0 | 1 | 2 | 3 | |
| 1 | 1 | 0 | 0 | 0 | 1 | 1 | 0 | 0 | 0 | 0 | 0 | 0 | 0 | 0 | 0 | 0 | 0 | 1 | 0 | 0 | 0 | |

FIG.15

| ... | MCS INFORMATION | | | | TRANSMISSION FORMAT INFORMATION | | ... |
|---|---|---|---|---|---|---|---|
| | 0 | 1 | 2 | 3 | 0 | 1 | |
| | 1 | 1 | 0 | 0 | 0 | 1 | |

FIG.16

| INDEX (Index) | MODULATION SCHEME | CODING RATE |
|---|---|---|
| 0 | Out of range | |
| 1 | QPSK | 1/3 |
| 2 | QPSK | 1/2 |
| 3 | QPSK | 3/5 |
| 4 | QPSK | 2/3 |
| 5 | QPSK | 3/4 |
| 6 | QPSK | 7/8 |
| 7 | 16QAM | 1/2 |
| 8 | 16QAM | 3/5 |
| 9 | 16QAM | 2/3 |
| 10 | 64QAM | 1/3 |
| 11 | 64QAM | 1/2 |
| 12 | 64QAM | 3/5 |
| 13 | 64QAM | 2/3 |
| 14 | 64QAM | 3/4 |
| 15 | 64QAM | 7/8 |

| TRANSMISSION FORMAT INFORMATION | MCS INFORMATION | NECESSITY OR NON-NECESSITY OF CANCELLATION PROCESS |
|---|---|---|
| 0 | – | NON-NECESSITY |
| 1~3 | 0~6 | |
| | 7~15 | NECESSITY |

BASE STATION DEVICE, MOBILE STATION DEVICE, COMMUNICATION SYSTEM, TRANSMISSION METHOD, RECEPTION METHOD, AND COMMUNICATION METHOD

TECHNICAL FIELD

The present invention relates to a base station device, a mobile station device, a communication system, a transmission method, a reception method, and a communication method.

BACKGROUND ART

In radio communication systems, such as WCDMA (Wideband Code Division Multiple Access), LTE (Long Term Evolution), and LTE-A (LTE-Advanced) which are proposed by 3GPP (Third Generation Partnership Project), and WiMAX (Worldwide Interoperability for Microwave Access) proposed by IEEE (The Institute of Electrical and Electronics Engineers), a communication area can be enlarged by providing a cellular configuration including a plurality of base station devices (each also called eNB or eNodeB) deployed such that ranges (cells) in each of which the base station device is connectable with a mobile station device (also called a terminal or UE (User Equipment)) are set to be partly overlapped with each other.

In order to increase the frequency usage efficiency of the cells in the above-described cellular configuration, it is studied, as discussed in Non Patent Literature (NPL) 1 mentioned below, (i) to repeatedly utilize the same frequency by the individual cells, or (ii) to construct a heterogeneous network in which, in addition to a base station device (macrocell) having a cell radius of several hundred meters to over ten kilometers, other base station devices (each called a picocell, a femtocell, or Home eNodeB) having various cell radii are deployed such that ranges of the other base station devices entirely or partly overlap with the macrocell.

FIG. 22 is a schematic view illustrating one example of a downlink in a radio communication system in which base station devices having different cell radii are deployed. A base station device 1000-2 is deployed with Single Frequency Reuse such that a cell 1000-2a (e.g., a picocell) of the base station device 1000-2 overlaps with a cell 1000-1a (macrocell) of a base station device 1000-1. A mobile station device is preferably controlled to be radio-connected to the base station device capable of receiving a signal with higher strength of a received electric field. In FIG. 22, a mobile station device 2000-1 is radio-connected (as denoted by r11) to the base station device 1000-1, and mobile station devices 2000-2 and 2000-3 are radio-connected to the base station device 1000-2 (as denoted by r21 and r23). Furthermore, when the picocell is deployed so as to include a cell edge and thereabout of the macrocell (i.e., in a region where the strength of the electric field is weak), the power of a signal received by the mobile station device can be increased by connecting the mobile station device 2000-3, which is present at the cell edge of the macro cell, to the picocell.

Thus, by constructing the heterogeneous network as described above, the frequency usage efficiency can be increased in total when viewed from networks present within an area covered by the macrocell.

CITATION LIST

Non Patent Literature

NPL 1: 3rd Generation Partnership Project; Technical Specification Group Radio Access Network; Further Advancements for E-UTRA Physical Layer Aspects (Release 9), 3GPP TR36. 814 v9. 0. 0. (2010-03) <URL:http://www.3gpp.org/ftp/Specs/html-info/36814.htm>

SUMMARY OF INVENTION

Technical Problem

However, there is a problem that, in the heterogeneous network, when the mobile station device connected to the picocell is positioned in a cell edge region of the picocell, transmission efficiency is mitigated due to interference from the macrocell (i.e., Inter-cell Interference). The mobile station device 2000-2 in FIG. 22 is radio-connected (as denoted by r21) to the base station device 1000-2 capable of receiving a signal with higher strength of a received electric field, but a distance from the mobile station device 2000-2 to the base station device 1000-1 is also short. Therefore, the mobile station device 2000-2 suffers from the Inter-cell Interference, as denoted by r12, from the base station device 1000-1 with a signal transmitted from the base station device 1000-1 using the same resources. As a result, a transmission throughput in the mobile station device 2000-2 lowers, and the frequency usage efficiency in the base station device 1000-2 also lowers.

The present invention has been made in view of the above-described problem, and an object of the present invention is to provide a base station device, a mobile station device, a communication system, and a communication method, which can efficiently mitigate or suppress the Inter-cell Interference in a radio communication system constituting a heterogeneous network.

Solution to Problem (1) The present invention has been made to solve the above-described problem, and according to one aspect of the present invention, there is provided a base station device communicating with a mobile station device, wherein the base station device notifies, to the mobile station device, control information related to a cell-specific reference signal that is specific to a cell ID of another base station device different from the aforesaid base station device, the control information containing information regarding number of ports for the cell-specific reference signal.

(2) A base station device according to another aspect of the present invention is constituted such that, in the base station device in above (1), a resource element deployed in accordance with the cell ID is set for the cell-specific reference signal.

(3) A base station device according to still another aspect of the present invention is constituted such that, in the base station device in above (1), the control information related to the cell-specific reference signal further contains information regarding a subframe in which the cell-specific reference signal is mapped.

(4) A base station device according to still another aspect of the present invention is constituted such that, in the base station device in above (1), the control information related to the cell-specific reference signal further contains power information with respect to the cell-specific reference signal.

(5) A base station device according to still another aspect of the present invention is constituted such that, in the base station device in above (1), the control information related to the cell-specific reference signal further contains information regarding necessity or non-necessity of a process for the cell-specific reference signal in the mobile station device.

(6) A base station device according to still another aspect of the present invention is constituted such that, in the base station device in above (1), the control information related to the cell-specific reference signal is notified as information specific to the mobile station device.

(7) According to still another aspect of the present invention, there is provided a mobile station device communicating with a base station device, wherein the mobile station device receives, from the base station device, control information related to a cell-specific reference signal that is specific to a cell ID of another base station device different from the aforesaid base station device, the control information containing information regarding number of ports for the cell-specific reference signal.

(8) A mobile station device according to still another aspect of the present invention is constituted such that, in the mobile station device in above (7), the mobile station device executes, in accordance with the control information related to the cell-specific reference signal, a process for the cell-specific reference signal.

(9) According to still another aspect of the present invention, there is provided a communication system in which a base station device and a mobile station device communicate with each other, wherein the base station device notifies, to the mobile station device, control information related to a cell-specific reference signal that is specific to a cell ID of another base station device different from the aforesaid base station device, the control information containing information regarding number of ports for the cell-specific reference signal, and the mobile station device receives, from the base station device, the control information related to the cell-specific reference signal.

(10) According to still another aspect of the present invention, there is provided a communication method for a base station device communicating with a mobile station device, the communication method comprising the step of notifying, to the mobile station device, control information related to a cell-specific reference signal that is specific to a cell ID of another base station device different from the aforesaid base station device, the control information containing information regarding number of ports for the cell-specific reference signal.

(11) According to still another aspect of the present invention, there is provided a communication method for a mobile station device communicating with a base station device, the communication method comprising the step of receiving, from the base station device, control information related to a cell-specific reference signal that is specific to a cell ID of another base station device different from the aforesaid base station device, the control information containing information regarding number of ports for the cell-specific reference signal.

(12) According to still another aspect of the present invention, there is provided a communication method for a communication system in which a base station device and a mobile station device communicate with each other, the communication method comprising the steps of notifying, from the base station device to the mobile station device, control information related to a cell-specific reference signal that is specific to a cell ID of another base station device different from the aforesaid base station device, the control information containing information regarding number of ports for the cell-specific reference signal, and receiving, by the mobile station device from the base station device, the control information related to the cell-specific reference signal.

(13) According to still another aspect of the present invention, there is provided an integrated circuit for a base station device communicating with a mobile station device, wherein the integrated circuit has a function of notifying, to the mobile station device, control information related to a cell-specific reference signal that is specific to a cell ID of another base station device different from the aforesaid base station device, the control information containing information regarding number of ports for the cell-specific reference signal.

(14) According to still another aspect of the present invention, there is provided an integrated circuit for a mobile station device communicating with a base station device, wherein the integrated circuit has a function of receiving, from the base station device, control information related to a cell-specific reference signal that is specific to a cell ID of another base station device different from the aforesaid base station device, the control information containing information regarding number of ports for the cell-specific reference signal.

Advantageous Effects of Invention

According to the present invention, the Inter-cell Interference can be efficiently mitigated or suppressed in a radio communication system constituting a heterogeneous network.

BRIEF DESCRIPTION OF DRAWINGS

FIG. 14 illustrates one example of a downlink control signal according to a third embodiment of the present invention.

FIG. 15 illustrates one example of a downlink control signal for base station device according to a fourth embodiment of the present invention.

FIG. 16 illustrates a modulation scheme and a coding rate with respect to an index of MCS information.

DESCRIPTION OF EMBODIMENTS

A radio communication system according to each of later-described embodiments of the present invention includes a plurality of base station devices (also called transmission devices, cells, transmission points, transmission antenna groups, transmission antenna port groups, component carriers, or eNodeB's) and a plurality of mobile station devices (also called terminals, terminal devices, mobile terminals, reception points, reception terminals, reception devices, reception antenna groups, reception antenna port groups, or UE (User Equipment)). Individual base station devices may have different transmission powers.

The later-described embodiments of the present invention can be applied to multi carrier transmission and single carrier transmission, including OFDM (Orthogonal Frequency Division Multiplexing), MC-CDMA (Multi Carrier-Code Division Multiple Access), SC-FDMA (Single Carrier-Frequency Division Multiple Access), DFT-s-OFDM (Discrete Fourier Transform-spread-OFDM), and so on.

The following description is made in connection with the case where the OFDM (Orthogonal Frequency Division Multiplexing) transmission is applied to a downlink in the radio communication system. In an uplink, the transmission method may be of any type insofar as the base station device can recognize control signals from the mobile station device.

First Embodiment

A first embodiment of the present invention will be described below.

Figure 1:
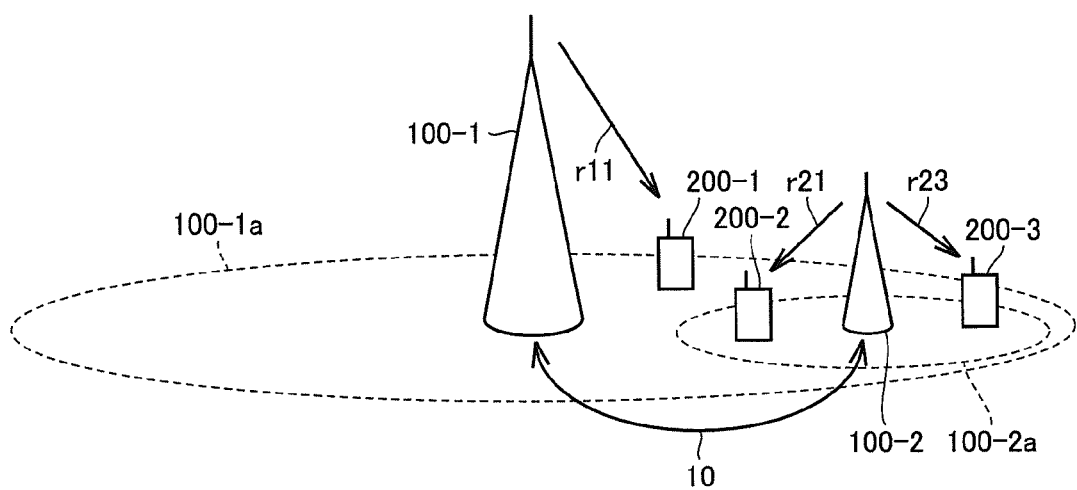
FIG. 1 is a schematic view illustrating one example of a downlink in a radio communication system in which a plurality of base station devices having different cell radii are deployed, according to a first embodiment of the present invention.

FIG. 1 is a schematic view illustrating one example of a downlink in a radio communication system in which a plurality of base station devices having different cell radii are deployed, according to a first embodiment of the present invention.

A base station device 100-2 is deployed with one-cell frequency reuse such that a cell 100-2*a* (e.g., a picocell or first base station device) of the base station device 100-2 overlaps with a cell 100-1*a* (macrocell or a second base station device) of a base station device 100-1. The individual base station devices are interconnected via a backhaul link 10 (e.g., an X2 interface) using an optical fiber, an Internet link, or a radio link, for example.

A mobile station device 200-1 is radio-connected (as denoted by r11) to the base station device 100-1, and mobile station devices 200-2 and 200-3 are radio-connected to the base station device 100-2 (as denoted respectively by r21 and r23). Signals for a downlink in the LTE include, for example, a Physical Downlink Shared Channel (PDSCH), Physical Downlink Control Channel (PDCCH), a Synchronization Signal (SS), a Physical Broadcast Channel (PBCH), a Cell-specific Reference Signal (CRS), a Channel State Information-Reference Signal (CSI-RS), a Demodulation Reference Signal (DMRS), a paging signal (Paging), a System Information Block (SIB).

The Physical Downlink Shared Channel is a channel for transmitting information data, etc. The Physical Downlink Control Channel implies a control signal for notifying, to the mobile station device, a coding rate and a modulation level (called MCS; Modulation and Coding Scheme) applied to information data of the Physical Downlink Shared Channel (PDSCH), the number of layers (number of ranks or spatial multiplexing number), schedule information (resource assignment information), and so on.

The Synchronization Signal is a signal allowing the mobile station device to establish and follow a self-search, frame synchronization, and symbol synchronization. Examples of the Synchronization Signal include a Primary Synchronization Signal (PSS) and a Secondary Synchronization Signal (SSS). The PSS is a data sequence capable of detecting not only symbol timing, but also a cell ID, and it is, for example, an orthogonal sequence, such as a Zadoff-Chu sequence. The term "cell ID" implies an ID assigned to each of the cells corresponding to the base station devices (transmission devices 100). The cell ID is used by the mobile station device (reception device 200) to identify the cell, i.e., the base station device (transmission device 100). The SSS is a data sequence capable of detecting the frame timing, and it is, for example, an M-sequence.

The Cell-specific Reference Signal is a known signal to measure channel states of the base station device and the mobile station device. The mobile station device measures, e.g., Reference Signal Received Power (RSRP) in the relevant cell using the Cell-specific Reference Signal and notifies a measured result to the base station device. By employing the measured result of the Reference Signal Received Power, the base station device can perform not only selection of a cell to which the relevant mobile station device is to be connected, but also handover to the selected cell.

The Channel State Information-Reference Signal is a known signal to measure channel states of the base station device and the mobile station device, and it is used to generate feedback information that is transmitted from the mobile station device to the base station device. The feedback information includes CQI (Channel Quality Indicator), PMI (Precoding Matrix Index), RI (Rank Indicator), and so on. The CQI implies information generated in consideration of a channel estimation result, etc., which have been estimated with the Channel State Information-Reference Signal, and it indicates the coding rate and the modulation scheme with which the mobile station device can maintain the prescribed reception quality. The PMI implies information generated in consideration of a channel estimation result, etc., which have been estimated with the Channel State Information-Reference Signal, and it indicates a precoding matrix suitable for the mobile station device. The RI implies information generated in consideration of a channel estimation result, etc., which have been estimated with the Channel State Information-Reference Signal, and it indicates the number of layers suitable for the mobile station device.

The Demodulation Reference Signal is a signal to measure channel states of the base station device and the mobile station device, and it is used to demodulate a downlink shared channel, for example. The paging signal (Paging) is used to perform calling control. The SIB implies system information transmitted in the downlink. The Physical Broadcast Channel (PBCH) is a channel informed over the entire cell for system control.

Figure 2:
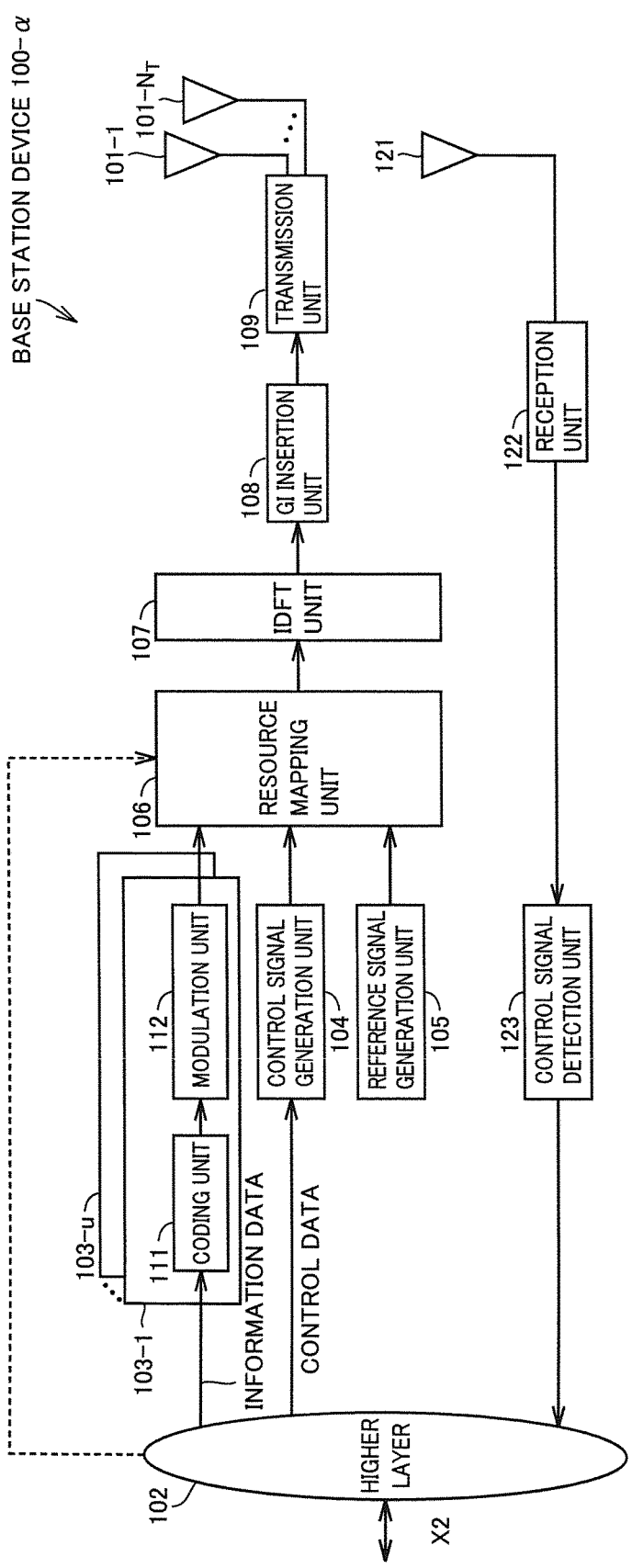
FIG. 2 is a schematic block diagram illustrating a configuration of the base station device in the radio communication system according to the first embodiment of the present invention.

FIG. 2 is a schematic block diagram illustrating a configuration of the base station device in the radio communication system according to the first embodiment of the present invention.

A base station device 100-$\alpha$ ($\alpha$=1, 2) includes an higher layer 102, a symbol generation unit 103-$u$ (u denotes the number of mobile station devices connected to the base station device), a control signal generation unit 104, a reference signal generation unit 105, a resource mapping unit 106, an IDFT unit 107, a GI insertion unit 108, and a transmission unit 109. A number $N_T$ of transmission antenna units 101-$n$ (n=1, ..., $N_T$) are connected to the transmission unit 109. The base station device 100-$\alpha$ further includes a reception unit 122 and a control signal detection unit 123. A reception antenna unit 121 is connected to the reception unit 122. When the base station device 100-$\alpha$ is partly or entirely constituted as an integrated circuit in the form of a chip, a chip control unit (not illustrated) for executing control of individual functional blocks is also disposed.

The base station device 100-$\alpha$ receives, via the reception antenna unit 121, signals containing a control signal and transmitted from the mobile station device 200-$u$ through an uplink. The reception unit 122 performs (i) down-conversion of the control signal, etc. to a frequency band where digital signal processing, such as signal detection process, is executable, (ii) a filtering process to remove the spurious, and (iii) conversion of a signal, which has been subjected to the filtering process, from an analog signal to a digital signal (i.e., Analog to Digital conversion).

The control signal detection unit 123 executes a demodulation process, a decoding process, etc. on the control signals output from the reception unit 122. The control signal is detected from, e.g., a Physical Uplink Control Channel (PUCCH) and/or a Physical Uplink Shared Channel (PUSCH). The higher layer 102 obtains the feedback information contained in the control signal that is input from the control signal detection unit 123.

The higher layer 102 outputs information data to the symbol generation unit 103-$u$ in accordance with the feedback information, and further outputs control data to the control signal generation unit 104. Herein, the term "higher layer" implies those ones of communication function layers defined in the OSI reference model, which have functions at upper levels than the Physical Layer and which include, e.g., a data link layer and a network layer. Moreover, the base station device executes scheduling of data modulation symbols, control signals, reference signals, etc. for each mobile station device in accordance with the feedback information, and then outputs them to the resource mapping unit 106 in accordance with the scheduling information. Herein, the term "scheduling information" implies information regarding a resource element or a resource block in which the data modulation symbols, the control signals, and the reference signals are selectively mapped. The term "resource element" implies a minimum unit in which a signal made up of one subcarrier and one OFDM symbol is mapped. The term "resource block" implies a resource unit including a plurality of resource elements together, and it is a minimum unit of resources assigned for each mobile station device. For example, the resource block can be given as resources including 12 subcarriers and 7 OFDM symbols.

Moreover, the higher layer 102 notifies, to an higher layer of another base station device (e.g., an adjacent base station or a macrocell or a picocell in a heterogeneous network), information related to downlink transmission of the relevant base station device through the backhaul link 10 illustrated in FIG. 1. The information related to the downlink transmission includes information of a downlink subframe format described later. The information related to the downlink transmission further includes, for example, information regarding the arrangement of Normal Subframes and resource-mapping limited subframes, the cell ID, the number of CRS ports, etc. The higher layer 102 additionally notifies other parameters that are necessary for the various components of the base station device 100-$\alpha$ to develop their functions.

The symbol generation unit 103-$u$ generates data modulation symbols from the information data input from the higher layer 102. The data modulation symbols correspond to, for example, the downlink shared channel, etc. The symbol generation unit 103-$u$ includes a coding unit 111 and a modulation unit 112.

The coding unit 111 executes an error correction coding process (using a turbo code, a convolution code, a Low Density Parity Check (LDPC) code, or the like) on the information data, and outputs coded bits. It is to be noted that, in the higher layer, the information data is preferably subjected to error detection coding, such as Cyclic Redundancy Check (CRC), to detect errors on the receiving side. Furthermore, the coding unit 111 may include a rate matching processing unit to make the coding rate matched with a data transmission rate. The rate matching processing unit executes, for example, a Puncture process of deleting part of data, a Repetition process of repeating part of data, or a Padding process of partly inserting temporary data (e.g., zero value). In addition, the coding unit 111 may interleave the generated coded bits and may output the interleaved coded bits to the modulation unit 112.

The modulation unit 112 executes modulation mapping of the coded bits input from the coding unit 111 and generates the data modulation symbols. A modulation process executed by the modulation unit 112 is, for example, BPSK (Binary Phase Shift Keying), QPSK (Quadrature Phase Shift Keying), 16QAM (16 Quadrature Amplitude Modulation), or 64QAM (64 Quadrature Amplitude Modulation). The modulation unit 112 outputs the generated data modulation symbols to the resource mapping unit 106. The modulation unit 112 may interleave the generated data modulation symbols and may output the interleaved data modulation symbols to the resource mapping unit 106. Moreover, the modulation unit 112 may execute precoding of the generated data modulation symbols and may output the data modulation symbols, having been subjected to the precoding, to the resource mapping unit 106.

The control signal generation unit 104 executes error correction coding and modulation mapping of the control data output from the higher layer 102, thereby generating the control signals. The control signals correspond to the Physical Downlink Control Channel (PDCCH), the Physical Broadcast Channel (PBCH), the Synchronization Signal (PSS, SSS), the paging signal (Paging), SIB-1, etc. The control signals may be subjected to precoding. In the first embodiment of the present invention, the control signals include information indicating the necessity of cancellation in the mobile station device and a cell for which the cancellation is to be performed (as described later in detail).

The reference signal generation unit 105 generates reference signals (pilot signals) with which the respective channels of the base station device and the mobile station device can be estimated. The reference signals correspond to the Cell-specific Reference Signal (CRS), the Channel State Information-Reference signal (CSI-RS), etc. A code sequence constituting each reference signal is preferably an orthogonal sequence, such as a Hardamard code or a CAZAC (Constant Amplitude Zero Auto-Correlation) sequence. Though not illustrated, the Demodulation Reference Signal (DM-RS) is multiplexed with the data modulation symbols, which are in a state before being subjected to the precoding in the modulation unit 112.

The resource mapping unit 106 executes mapping of the data modulation symbols, the control signals, and the reference signals to the resource elements (such mapping being referred to as "resource mapping" hereinafter) in accordance with the scheduling information notified from the higher layer 102. The scheduling information implies information indicating arrangement of individual signals in accordance with a transmission frame format described later, for example.

The IDFT unit 107 executes Inverse Discrete Fourier Transform (IDFT) on a frequency domain signal that is output from the resource mapping unit 106, thereby converting the frequency domain signal to a time domain signal. The IDFT unit 107 outputs the converted time domain signal to the GI insertion unit 108. While the IDFT unit 107 executes the function of converting the frequency domain signal to the time domain signal, the function of the IDFT unit 107 is not limited to such conversion. For example, the IDFT unit 107 may execute Inverse Fast Fourier Transform (IFFT).

The GI insertion unit 108 generates an OFDM symbol by adding a GI to the time domain signal input from the IDFT unit 107. The GI insertion unit 108 sets the input time domain signal as an effective symbol and prefixes a part of the latter half thereof, as a GI, to the effective symbol. The effective symbol added with the GI is the OFDM symbol. The GI insertion unit 108 outputs the generated OFDM symbol to the transmission unit 109. By employing the OFDM symbol thus generated, the mobile station device 200-$u$ can remove distortion that is caused by a delay path having a delay time shorter than a GI length. In the LTE, for example, the GI length, i.e., the number of sample points, is 144 (6.7 μs).

A signal $s_l(t)$ of a first OFDM symbol output from the GI insertion unit 108 is expressed by the following formula.

[Math. 1]

$$S_l(t) = \frac{1}{\sqrt{N_f}} \sum_{k=0}^{N_f-1} c_{k,l} e^{j2\pi k \Delta_f (t - lT_s - T_G)} \tag{1}$$

In the above formula, $1T_s \leq t < (l+1)T_s$ is satisfied, and $T_s$ denotes an OFDM symbol length ($T_s = T_f + T_G$). $T_f$ denotes an FFT interval length. $T_G$ denotes a GI length. $N_f$ denotes the number of IDFT points. $C_{k,l}$ denotes a data modulation symbol, a control signal, or a reference signal mapped to a k-th subcarrier of a first OFDM symbol. $\Delta_f$ denotes a subcarrier interval. In the LTE, for example, $N_f$ is 2048 and $\Delta_f$ is 15 kHz.

The transmission unit 109 executes D/A (Digital-to-Analog) conversion of the OFDM symbol input from the GI insertion unit 108 to generate an analog signal, and further generates a band limited signal by limiting a band of the generated analog signal with a filtering process. The transmission unit 109 up-converts the generated band limited signal to a radio frequency band to generate a carrier-band OFDM, and transmits the generated carrier-band OFDM signal, in the form of an electric wave, to the mobile station device 200-$u$ from the transmission antenna unit 101-$n$. In the base station device 100-α, transmission from a plurality of transmission antennas may be performed as Diversity transmission or MIMO (Multiple Input Multiple Output) transmission.

Figure 3:
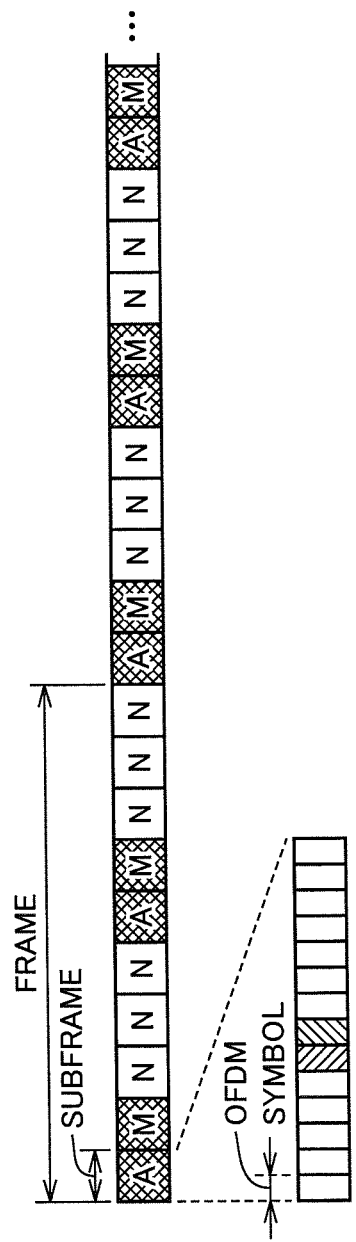
FIG. 3 illustrates a transmission frame format for a downlink of a base station device 100-1 in the radio communication system according to the first embodiment of the present invention.

FIG. 3 illustrates a transmission frame format for a downlink of the base station device 100-1 in the radio communication system according to the first embodiment of the present invention. On frame is made up of ten plural types of subframes including Normal Subframes and resource-mapping limited subframes (hereinafter also referred to as "limited subframes"). An example of the resource mapping limited subframes is MBSFN (Multimedia Broadcast multicast service Single Frequency Network) or ABS (Almost Blank Subframe).

The term "Normal Subframe" implies a subframe for which resource mapping of the information data, the control data, and the reference signals, each transmitted from the base station device 100-1, in accordance with the above-described scheduling information is allowed. For example, the Physical Downlink Shared Channel, the Physical Downlink Control Channel, the Synchronization Signal, the Physical Broadcast Channel, the Cell-specific Reference Signal, the Channel State Information-Reference Signal, the paging signal, SIB-1, etc. can be mappeded to the Normal Subframe by resource mapping.

On the other hand, the term "resource-mapping limited subframe" implies a subframe for which the resource mapping is limited to predetermined signals transmitted from the base station device 100-1. In this embodiment, the MBSFN subframe or the ABS is used as the resource-mapping limited subframe.

The MBSFN subframe is a subframe that is prepared to send a broadcast signal or a multicast signal. The MBSFN subframe does not transmit the Cell-specific Reference Signal (CRS) that is set per cell in a data area (PDSCH), in anticipation of simultaneous transmission of data from plural cells. Therefore, the mobile station device 200-u does not measure the CRS in the MBSFN subframe. Accordingly, the base station device 100-1 can stop the transmission of the information data without being recognized by the mobile station device 200-u. In the MBSFN subframe, for example, the PDCCH and the CRS in a PDCCH area are transmitted, but other data areas and the CRSs in those data areas are not transmitted. The ABS is a subframe capable of transmitting only the Synchronization Signal, the Physical Broadcast Channel, the Cell-specific Reference Signal, the Channel State Information-Reference Signal, the paging signal, and the SIB-1. In other words, the resource mapping of the Physical Downlink Shared Channel and the Physical Downlink Control Channel is limited. The MBSFN subframe and the ABS may be set at the same time. In such a subframe, only the CRS in the PDCCH area is transmitted, while the PDCCH, the data area, and the CRS in the data area are not transmitted. The term "multicast" implies transmission of the same information data signal to a definite number of mobile station devices, and the term "broadcast" implies transmission of the same information data signal to an indefinite number of mobile station devices.

The frame format of FIG. 3 represents an example in which the first, second, sixth and seventh subframes (double hatched) are set as the resource-mapping limited subframes, and the other frames (voided) are set as the Normal Subframes. Furthermore, among the resource-mapping limited subframes in the illustrated example, the second and seventh subframes are set as the MBSFN subframes, and the first and sixth subframes are set as the ABSs. Setting (ratio) of the Normal Subframes and the resource-mapping limited subframes in a transmission frame can be made changeable depending on, e.g., the number of mobile station devices to which each base station device is connected. In addition, an index for a subframe to which the resource-mapping limited subframe is to be allocated may be previously specified using a table, for example, depending on the ratio of the Normal Subframes and the resource-mapping limited subframes.

One subframe is made up of 14 OFDM symbols. FIG. 3 illustrates an example of resource mapping in which, as the Synchronization Signal, the SSS is mapped to the sixth OFDM symbol (i.e., a portion hatched by lines ascending toward the left), and the PSS is mapped to the seventh OFDM symbol (i.e., a portion hatched by lines ascending toward the right). Furthermore, those Synchronization Signals are mapped to the first subframe and the sixth subframe by the resource mapping.

The transmission frame format for the downlink of the base station device 100-1, illustrated in FIG. 3, can be set in units of 40 subframes. The base station device 100-1 notifies the set information regarding the transmission frame format for the downlink of the base station device 100-1 (i.e., transmission frame format information) to the base station device 100-2 through the backhaul link 10. For example, the transmission frame format information may be information in the bit map format of 40 bits with the Normal Subframe denoted by "1" and the resource-mapping limited subframe denoted by "0". Furthermore, the transmission frame format information allows addition or change of information indicating that the base station device 100-1 recommends the base station device 100-2 to limit RLM (Radio Link Monitoring)/RPM (Radio Resource Management) measurement.

Figure 4:
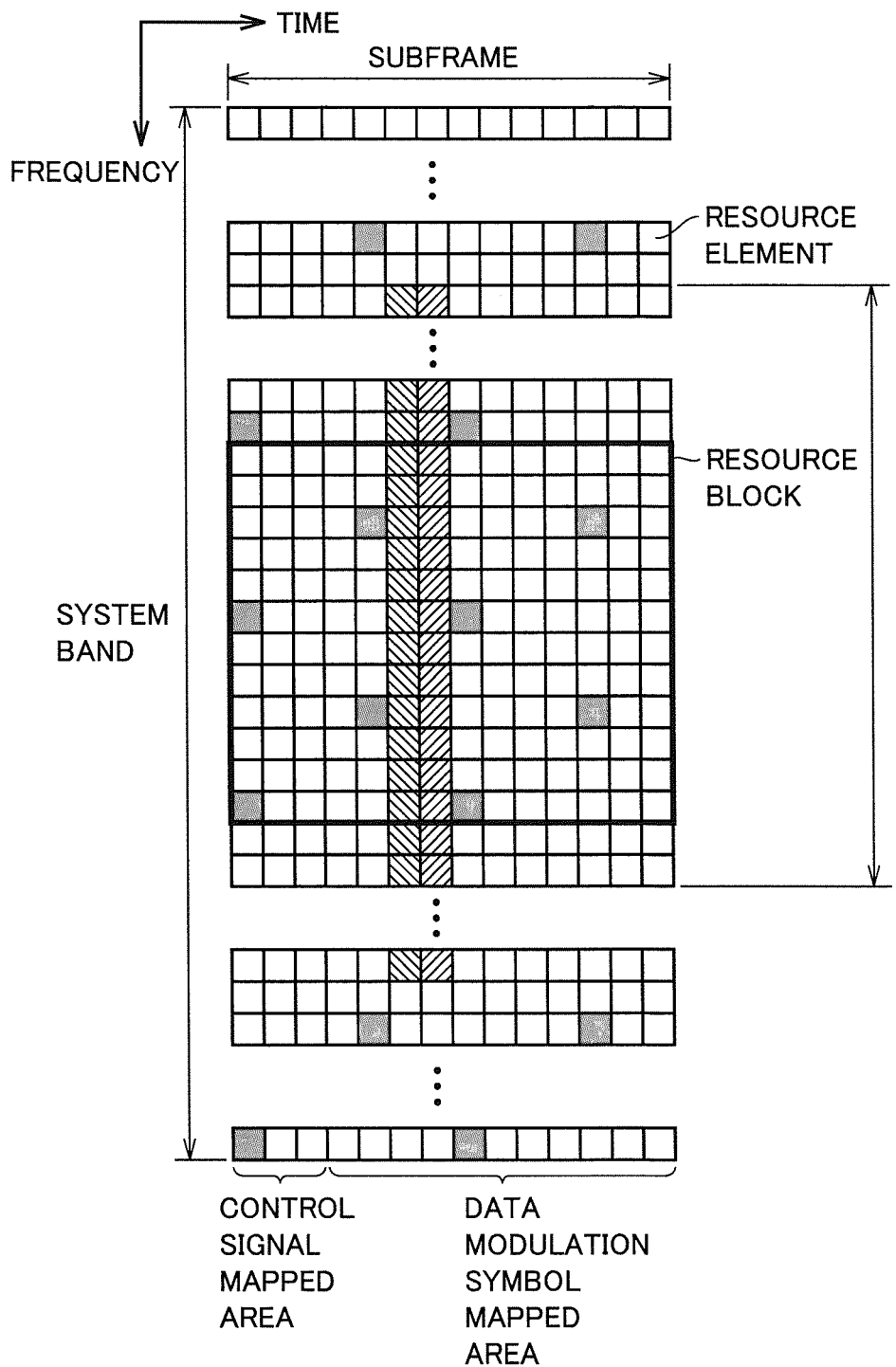
FIG. 4 is a conceptual view illustrating one example of a subframe format according to the embodiment. The example illustrated in FIG. 4 represents one exemplary case where a base station device 100-a performs transmission by employing one antenna.

FIG. 4 is a conceptual view illustrating one example of a subframe format according to the first embodiment of the present invention. The example illustrated in FIG. 4 represents one exemplary case where the base station device 100-α performs transmission by employing one antenna port.

In FIG. 4, the horizontal direction represents time, and the vertical direction represents frequency. FIG. 4 illustrates a format of each of the first and sixth subframes in FIG. 3. The PSS corresponds to the seventh OFDM symbol, and it is mapped in resource elements (i.e., portions hatched by lines ascending toward the right), which are constituted by 63 intermediate subcarriers (frequency bands) in a system band. The SSS corresponds to the sixth OFDM symbol, and it is mapped in resource elements (i.e., portions hatched by lines ascending toward the left), which are constituted by 63 intermediate subcarriers (frequency bands) in the system band.

The data modulation symbols and the reference signals are mapped in units of a resource block pair (denoted by thick lines), which is constituted by two resource blocks. Each resource block pair is made up of 168 resource elements that occupy frequencies indicated by 12 subcarriers and times indicated by 14 OFDM symbols. The control signals, such as the PDCCH, are mainly mapped in one to three areas at the beginning of the 14 OFDM symbols constituting the resource block pair. The remaining eleven to thirteen areas of the OFDM symbols are areas where the data modulation symbols, such as the PDSCH, are mainly mapped. The Cell-specific Reference Signal is mapped in predetermined ones (i.e., filled-in portions) of the resource elements constituting each resource block. It is to be noted that the resource element in which the Cell-specific Reference Signal is mapped is cyclically shifted in the frequency direction depending on the cell ID of the base station device 100-α.

Using the subframe format illustrated in FIG. 4, the base station device 100-1 executes scheduling for the mobile station device 200-1 to perform resource mapping of the PDSCH and the PDCCH to only the Normal Subframes, taking into consideration the feedback information. Thus, when the resource mapping unit 106 executes the resource mapping in accordance with the scheduling information, the base station device 100-1 can transmit the PDSCH and the PDCCH to the mobile station device 200-1 by employing only the Normal Subframes. On the other hand, in the resource-mapping limited subframe, a voided portion where the PDCCH, for example, is mapped by the resource mapping can be set such that any signal is not mapped there. As a result, the Inter-cell Interference with respect to the mobile station device connected to the base station device 100-2 can be mitigated in the resource-mapping limited subframe.

Figure 5:
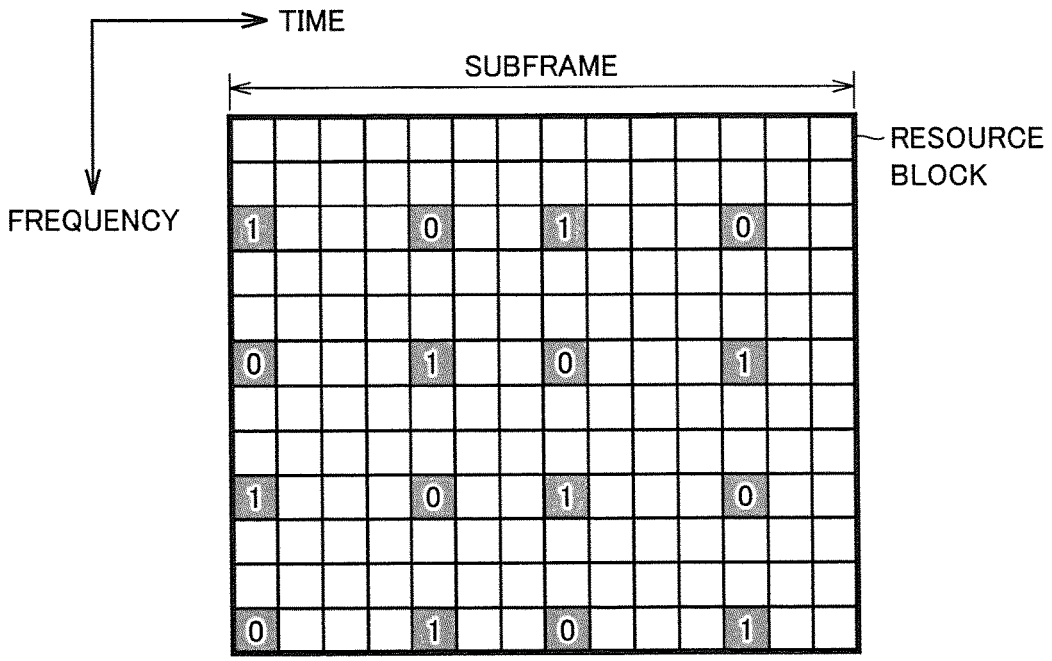
FIG. 5 is a conceptual view illustrating another example of the subframe format according to the first embodiment of the present invention.

FIG. 5 is a conceptual view illustrating another example of the subframe format according to the first embodiment of the present invention. The example illustrated in FIG. 5 represents one exemplary case where the base station device 100-α performs transmission by employing two antennas (antenna ports). In FIG. 5, the horizontal direction represents time, and the vertical direction represents frequency. The Cell-specific Reference Signal is mapped in predetermined ones (i.e., filled-in portions) of the resource elements constituting each resource block. In FIG. 5, the reference signal transmitted from one of the two antennas is mapped to a resource element 0 by the resource mapping. The Cell-specific Reference Signal transmitted from the other of the two antennas is mapped to a resource element 1 by the resource mapping. The subframe format for the base station device 100-α is given by arranging the resource block of FIG. 5 in place of the resource block in the subframe format of FIG. 4.

Figure 6:
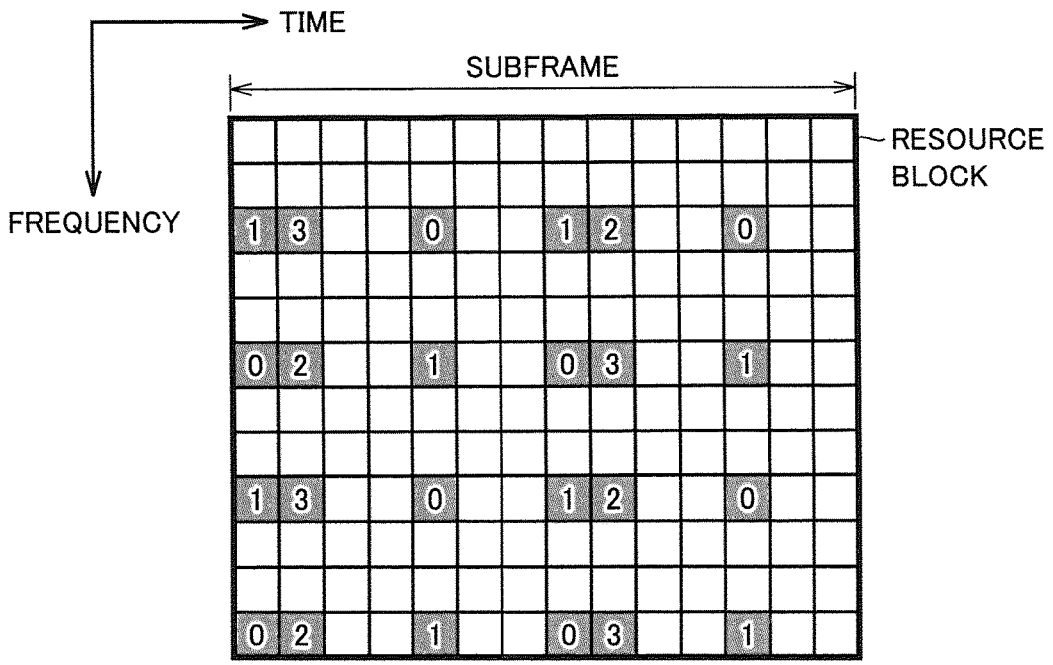
FIG. 6 is a conceptual view illustrating still another example of the subframe format according to the first embodiment of the present invention.

FIG. 6 is a conceptual view illustrating still another example of the subframe format according to this embodiment. The example illustrated in FIG. 6 represents one exemplary case where the base station device 100-α performs transmission by employing four antennas. In FIG. 6, the horizontal direction represents time, and the vertical direction represents frequency. The Cell-specific Reference Signal is mapped in predetermined ones (i.e., filled-in portions) of the resource elements constituting each resource block. In FIG. 6, the Cell-specific Reference Signal transmitted from one of the four antennas is mapped to a resource element 0 by the resource mapping. The Cell-specific Reference Signal transmitted from another one of the four antennas is mapped to a resource element 1 by the resource mapping. The Cell-specific Reference Signal transmitted from still another one of the four antennas is mapped to a resource element 2 by the resource mapping. The Cell-specific Reference Signal transmitted from still another one of the four antennas is mapped to a resource element 3 by the resource mapping. The subframe format for the base station device 100-α is given by arranging the resource block of FIG. 6 in place of the resource block in the subframe format of FIG. 4. As described above, the number of reference signals is increased and decreased depending on the number of transmission antennas and the number of layers in the base station device 100-α.

Figure 7:
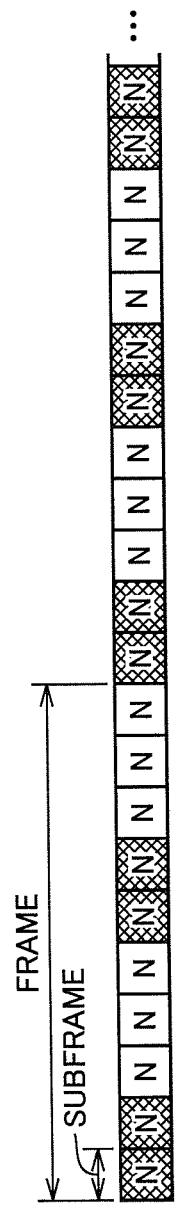
FIG. 7 illustrates a transmission frame format for a downlink of a base station device 100-2 in the radio communication system according to the first embodiment of the present invention.

FIG. 7 illustrates a transmission frame format for a downlink of the base station device 100-2 in the radio communication system according to the first embodiment of the present invention. One frame is made up of ten Normal Subframes. A format of each subframe is similar to the format illustrated in FIG. 4 except for that the position where the Cell-specific Reference Signal is mapped is cyclically shifted depending on the cell ID.

The base station device 100-2 executes the resource mapping of the PDSCH, the PDCCH, etc. by employing not only the feedback information obtained from the mobile station device 200-2 and the mobile station device 200-3, but also control data (such as the transmission frame format information, the cell ID, and the number of CRS ports) in the downlink of the base station device 100-2, the control data being obtained through the backhaul link 10.

For example, the base station device 100-2 preferably executes the resource mapping of the PDSCH and the PDCCH, both transmitted to a mobile station device, e.g., the mobile station device 200-2, which is estimated to receive relatively strong interference from the base station device 100-1, to any of the subframes (i.e., the double hatched portions in FIG. 7) transmitted from the base station device 100-2 at the same time as when the base station device 100-1 transmits the resource-mapping limited subframes. Furthermore, the base station device 100-2 can perform the resource mapping of the PDSCH and the PDCCH, both transmitted to a mobile station device, e.g., the mobile station device 200-3, which is estimated to receive relatively weak interference from the base station device 100-1, to any of the subframes (i.e., the double hatched portions in FIG. 7) transmitted from the base station device 100-2 at the same time as all subframes, including the resource-mapping limited subframes, transmitted from the base station device 100-1. In another example, the base station device 100-2 executes the resource mapping of the PDSCH and the PDCCH, both transmitted to the mobile station device 200-2 and the mobile station device 200-3, to any of the subframes (i.e., the double hatched portions in FIG. 7) that are set as the resource-mapping limited subframes by the base station device 100-1, and it does not execute the resource mapping to the other subframes. By performing the scheduling in such a manner, the Inter-cell Interference received from the signal transmitted by the base station device 100-1 can be mitigated in the mobile station device connected to the base station device 100-2.

When the mobile station device is mapped to a subframe transmitted at the same time as the ABS among the resource-mapping limited subframes set by the base station device 100-1, the CRS from the base station device 100-1 causes interference on the relevant mobile station device. In such a case, the relevant mobile station device preferably performs a process of canceling the CRS from the base station device 100-1. Furthermore, when the mobile station device is mapped to a subframe transmitted at the same time as the Normal Subframe set by the base station device 100-1, the CRS from the base station device 100-1 causes interference on the relevant mobile station device. In such a case, the relevant mobile station device preferably performs a process of canceling the CRS from the base station device 100-1. When the mobile station device is mapped to a subframe transmitted at the same time as the MBSFN subframe among the resource-mapping limited subframes set by the base station device 100-1, the CRS from the base station device 100-1 causes no interference on the relevant mobile station device. In such a case, the relevant mobile station device preferably does not perform a process of canceling the CRS from the base station device 100-1.

To solve the above-mentioned problems, in the first embodiment of the present invention, information related to an interference cancellation process for the CRS from the base station device 100-1 (i.e., interference cancellation information) is contained in a downlink control signal for the mobile station device connected to the base station device 100-2. The control signal is, for example, the PDCCH or RRC (Radio Resource Control) signaling. The RRC signaling is a control signal that is contained in the PBCH or the PDSCH. In comparison with the PDCCH, the RRC signaling has a larger amount of transmittable information and is semi-static with a lower frequency of update (transmission).

When a mobile station device receives a notification indicating the necessity of the interference cancellation process, the mobile station device performs a process of canceling the Inter-cell Interference for a predetermined period after the reception of the notification (details of the interference cancellation process in the mobile station device will be described below). In one example, the base station device 100-2 prepares, in the PDCCH or the RRC signaling, an area of 1 bit for indicating information regarding necessity or non-necessity of the interference cancellation, and notifies the non-necessity of the cancellation process by setting "0" in the relevant area and the necessity of the cancellation process by setting "1" in the relevant area.

In more detail, when the necessity of the cancellation process is set using the PDSCH, the mobile station device performs the process of canceling the CRS, transmitted from the base station device 100-1, on the PDSCH that is scheduled (mapped) to the relevant subframe. When the necessity of the cancellation process is set using the RRC signaling, the mobile station device performs, until the interference cancellation information is updated, the process of canceling the CRS, transmitted from the base station device 100-1, on the PDSCH that is scheduled (mapped) during a period until the update of the interference cancellation information.

The necessity or the non-necessity of the interference cancellation is determined, for example, based on determination criteria described below. When transmitting information data to the mobile station device by employing a subframe corresponding to the ABS among the resource-mapping limited subframes set by the base station device 100-1, or a subframe corresponding to the Normal Subframe, the base station device 100-2 notifies the information indicating the necessity of the cancellation. On the other hand, when transmitting information data to the mobile station device by employing a subframe corresponding to the MBSFN subframe among the resource-mapping limited subframes set by the base station device 100-1, the base station device 100-2 notifies the information indicating the non-necessity of the cancellation.

In another example, the base station device 100-2 transmits information data to the mobile station device by employing a subframe corresponding to the ABS among the resource-mapping limited subframes set by the base station device 100-1, or a subframe corresponding to the Normal Subframe, and further notifies the information indicating the necessity of the cancellation when the MCS of the transmitted information data is not less than a predetermined level. In still another example, when the base station device 100-1 transmits the Cell-specific Reference Signal in number not less than a predetermined value by employing a subframe corresponding to the ABS among the resource-mapping limited subframes or a subframe corresponding to the Normal Subframe, the base station device 100-2 notifies the information indicating the necessity of the cancellation. In still another example, the necessity or the non-necessity of the cancellation is determined in the radio communication system based on a mode of the transmission frame format. More specifically, when the base station device 100-1 transmits a signal in a mode of the transmission frame format including the resource-mapping limited subframe, the base station device 100-2 notifies the information indicating the necessity of the cancellation. It is to be noted that the number of reference signals mentioned above and the mode of the transmission frame format can be shared by the base station devices through the backhaul link 10.

The determination criteria described above can be applied to only a mobile station device for which the base station device 100-2 estimates the interference caused by the CRS transmitted from the base station device 100-1 to be strong. In other words, the base station device 100-2 may notify the information indicating the non-necessity of the cancellation without applying the above-described determination criteria to a mobile station device for which the interference caused by the CRS transmitted from the base station device 100-1 is estimated to be weak.

Furthermore, in the first embodiment of the present invention, cell information to execute the interference cancellation process is contained in a control signal for the downlink. The control signal is, for example, the PDCCH or RRC (Radio Resource Control) signaling. The cell information corresponds to the cell ID, the number of CRS ports, power information of the CRS (including a power ratio relative to a data signal, etc.), and so on. In one example, the base station device 100-2 prepares, in the PDCCH, an area for indicating the cell information to execute the interference cancellation process, and notifies the cell information of the transmission source for the signal on which the cancellation process is to be executed. In another example, the base station device 100-2 prepares, in the RRC signaling, an area for indicating the cell information to execute the interference cancellation process, and previously notifies the cell information regarding the transmission source of the signal on which the cancellation process is to be executed.

In FIG. 1, the base station device 100-2 notifies the cell ID, the number of CRS ports, the power information of the CRS, etc. of the base station device 100-1 to the mobile station device 200-2 and/or the mobile station device 200-3 by employing the control signal. Based on the cell ID and the number of CRS ports thus notified, the mobile station device can specify or estimate the resource element to which the relevant base station device has mapped the CRS by the resource mapping, and a value of the CRS. As a result, the mobile station device can execute the process of canceling the relevant Cell-specific Reference Signal (CRS). The RRC signaling may be transmitted with the PBCH or the PDSCH.

When notifying the information indicating the necessity or the non-necessity of the interference cancellation process or the cell information to execute the interference cancellation process with the downlink control signal by employing the RRC signaling transmitted with the PBCH, the base station device 100-2 can notify the above-mentioned information as Cell-Specific information. Moreover, when notifying the information indicating the necessity or the non-necessity of the interference cancellation process or the cell information to execute the interference cancellation process with the downlink control signal by employing the RRC signaling transmitted with the PDSCH, the base station device 100-2 can notify the above-mentioned information as UE- (User Equipment-) Specific information.

Figure 8:
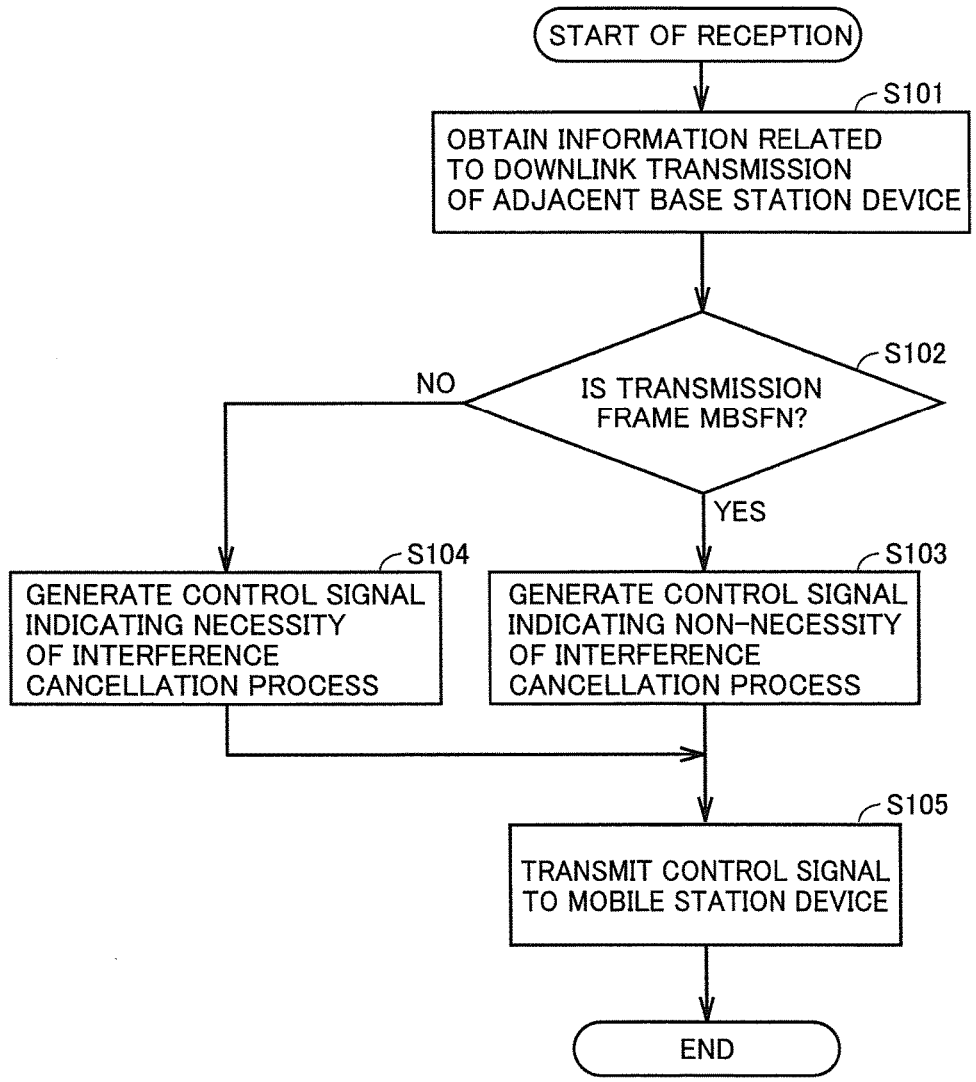
FIG. 8 is a transmission flowchart for the base station device 100-2 in the radio communication system according to the first embodiment of the present invention.

FIG. 8 is a transmission flowchart for the base station device 100-2 in the radio communication system according to the first embodiment of the present invention.

The base station device 100-2 obtains information related to downlink transmission of an adjacent base station device (i.e., the base station device 100-1) through the backhaul link 10 (S101). The information related to downlink transmission includes information regarding the transmission frame format.

Next, the base station device 100-2 determines, based on the information related to downlink transmission, whether or not the subframe transmitted from the base station device 100-1 is the MBSFN (S102). If it is determined that the relevant subframe is not the MBSFN (NO in S102), the base station device 100-2 generates a control signal for notifying the necessity of the cancellation process to the mobile station device 200-u (u=2 and/or 3 in the case of FIG. 1) (S104).

On the other hand, if it is determined that the relevant subframe is the MBSFN (YES in S102), the base station device 100-2 generates a control signal for notifying the non-necessity of the cancellation process to the mobile station device 200-u (u=2 and/or 3 in the case of FIG. 1) (S103). Thereafter, the base station device 100-2 transmits the control signal and a data signal (e.g., PDSCH) to the mobile station device (S105), and brings the processing to an end. It is to be noted that the control signal transmitted to the mobile station device may include the cell information, the number of CRS ports, and other information.

The configuration of the mobile station device according to the first embodiment of the present invention will be described below.

Figure 9:
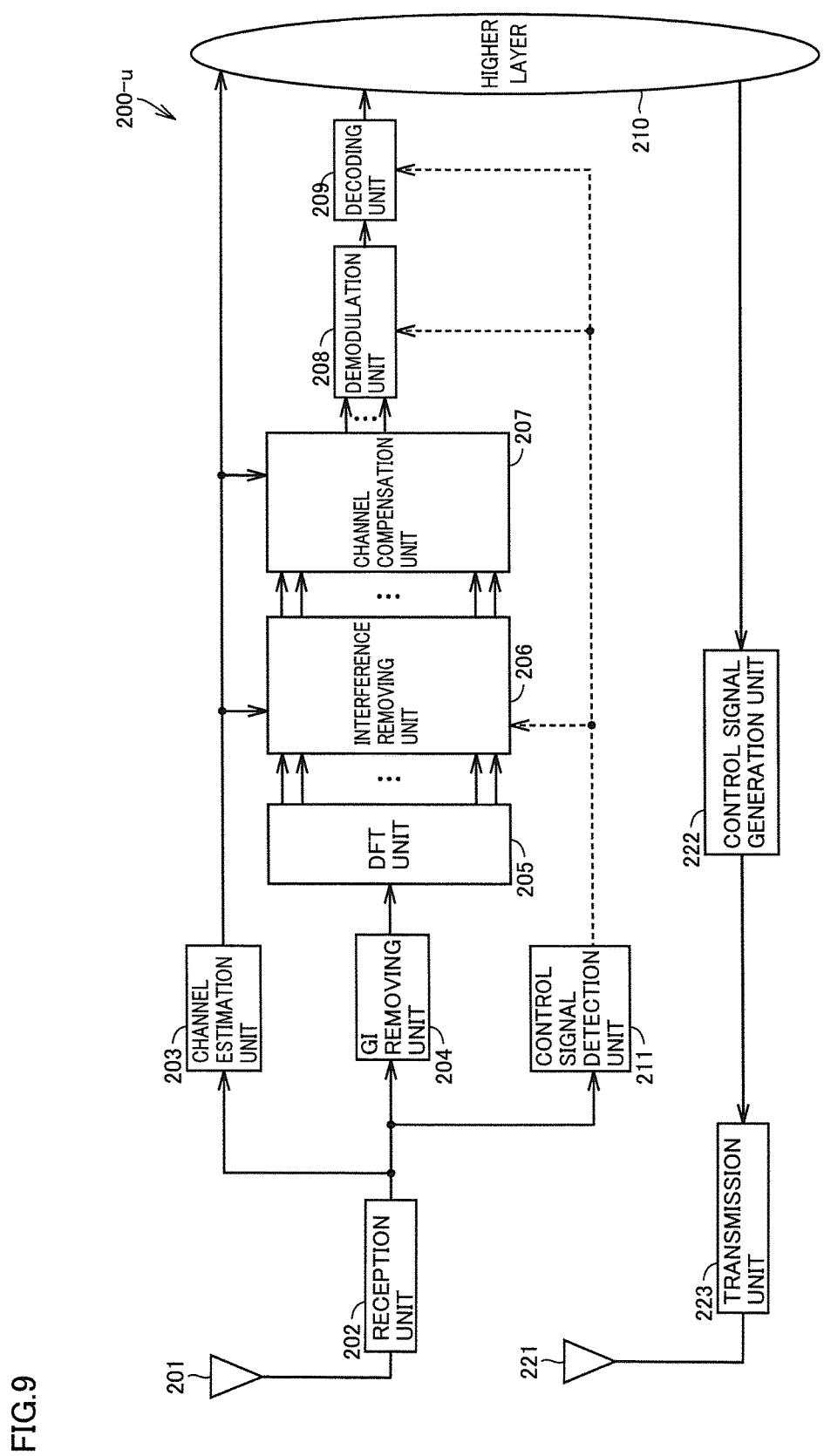
FIG. 9 is a schematic block diagram illustrating a configuration of a mobile station device 200-*u* in the radio communication system according to the first embodiment of the present invention.

FIG. 9 is a schematic block diagram illustrating the configuration of the mobile station device 200-u (u=1 to 3 in FIG. 1) in the radio communication system according to the first embodiment of the present invention. The mobile station device 200-u includes a reception antenna unit 201, a reception unit 202, a channel estimation unit 203, a GI removing unit 204, a DFT unit 205, an interference removing unit 206, a channel compensation unit 207, a demodulation unit 208, a decoding unit 209, an higher layer 210, a control signal detection unit 211, a transmission antenna unit 221, a control signal generation unit 222, and a transmission unit 223.

The reception antenna unit 201 receives an OFDM signal in a carrier band, which is transmitted in the form of an electric wave from the base station device 100-2, and outputs the received OFDM signal in the carrier band to the reception unit 202. At that time, the reception antenna unit 201 further receives an OFDM signal in the carrier band, which is transmitted from the base station device 100-1, thus causing the Inter-cell Interference.

The reception unit 202 down-converts the OFDM signal, input from the reception antenna unit 201, to a frequency band where digital signal processing is executable, and further executes a filtering process of the down-converted signal to remove the unnecessary component (Spurious). In addition, the reception unit 202 executes (A/D: Analog to Digital) conversion of the signal, which has been subjected to the filtering process, from an analog signal to a digital signal, and outputs the converted digital signal to the channel estimation unit 203, the GI removing unit 204, and the control signal detection unit 211.

The channel estimation unit 203 executes channel estimation by employing a reference signal contained in the signal output from the reception unit 202, thereby generating a channel estimation value. Then, the channel estimation unit 203 notifies the channel estimation value to the interference removing unit 206, the channel compensation unit 207, and the higher layer 210. The channel estimation value is given as a transfer function or impulse response, for example.

The control signal detection unit 211 detects the control signal (e.g., the PDCCH or the RRC signaling) that is contained in the signal output from the reception unit 202. Furthermore, the control signal detection unit 211 extracts information regarding the MCS, the precoding matrix, and the number of layers, which are applied to information data, etc. contained in the control signal, and notifies the extracted information to the demodulation unit 208 and the decoding unit 209. In addition, the control signal detection unit 211 extracts the information indicating the necessity or the non-necessity of the cancellation process in the mobile station device and the cell information of the transmission source of the signal on which the cancellation process is to be executed, such information being contained in the control signal, and notifies the extracted information to the interference removing unit 206.

The GI removing unit 204 removes the GI from the signal output from the reception unit 202, and outputs the signal after removing the GI to the DFT unit 205.

The DFT unit 205 executes Discrete Fourier Transform (DFT) on the signal, which is input from the GI removing unit 204 and from which the GI has been removed, for conversion from a time domain signal to a frequency domain signal, and outputs the converted frequency domain signal to the interference removing unit 206. The conversion method executed in the DFT unit 205 is not limited to the DFT insofar as the DFT unit 205 can convert a signal from a time domain to a frequency domain. For example, the DFT unit 205 may execute Fast Fourier Transform (FFT), etc.

The interference removing unit 206 executes a process of removing an interference component from the signal input from the DFT unit 205, (i) based on the information indicating the necessity or the non-necessity of the cancellation process in the mobile station device and/or the cell information of the transmission source of the signal on which the interference cancellation process is to be executed, or (ii) by employing the channel estimation value input from the channel estimation unit 203. More specifically, the interference removing unit 206 removes the known signal, e.g., the CRS, which is transmitted from the base station device corresponding to the notified cell ID, from the frequency domain signal input from the DFT unit 205 (as described in detail later).

The channel compensation unit 207 calculates a weight coefficient to compensate for a channel distortion attributable to fading, for example, based on the channel compensation value input from the channel estimation unit 203 by employing ZF (Zero Forcing) equalization, MMSE (Minimum Mean Square Error) equalization, or another suitable method. The channel compensation unit 207 multiplies the frequency domain signal input from the interference removing unit 206 by the calculated weight coefficient, thereby executing channel compensation.

The demodulation unit 208 executes a demodulation process on a signal (data modulation symbol) after the channel compensation, the signal being input from the channel compensation unit 207. The demodulation process may be executed with hard decision (calculation of a coded bit sequence) or soft decision (calculation of code bit LLR).

The decoding unit 209 calculates information data, transmitted to be destined for the relevant mobile station device, by executing an error correction decoding process on the coded bit sequence (or the coded bit LLR) after the demodulation, which is output from the demodulation unit 208, and outputs the calculated information data to the higher layer 210. A method used in the error correction decoding process is selected corresponding to the error correction coding, e.g., turbo coding or convolution coding, which has been executed in the base station device 100 as a transmission source. The error correction coding process may be executed with hard decision or soft decision. When the base station device transmits the interleaved data modulation symbols, the decoding unit 209 executes, prior to the error correction decoding process, a process of deinterleaving the input coded bit sequence corresponding to the interleaving in the base station device. The decoding unit 209 then executes the error correction decoding process on the signal that has been subjected to the deinterleaving process.

The control signal generation unit 222 generates a control signal for transmitting feedback information (including the CQI, the RI, and the PMI) to the base station device. The feedback information is determined by the higher layer 210 based on the channel estimation value calculated by the channel estimation unit 203.

The control signal generation unit 222 generates the control signal by executing error correction coding and modulation mapping on control data that represents the feedback information. The control signal corresponds to, e.g., the PUCCH. Signals containing the control signal output from the control signal generation unit 222 are up-converted by the transmission unit 223 to a frequency band transmittable in the downlink, and are transmitted to the base station device via the transmission antenna unit 221.

The configuration and the function of the interference removing unit 206 according to the first embodiment will be described below.

Figure 10:
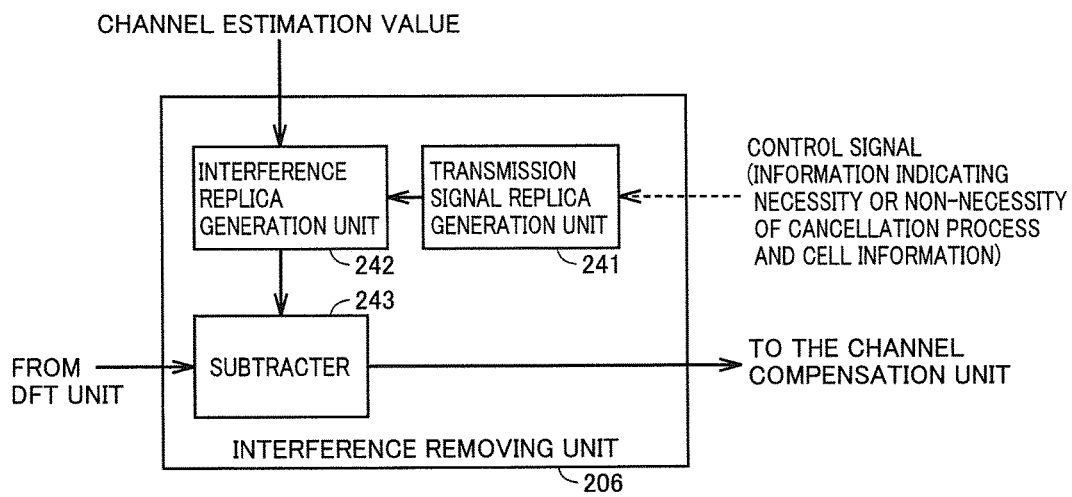
FIG. 10 is a schematic view illustrating a configuration of an interference removing unit 206 according to the first embodiment of the present invention.

FIG. 10 is a schematic view illustrating the configuration of the interference removing unit 206 according to the first embodiment. The interference removing unit 206 includes a transmission signal replica generation unit 241, an interference replica generation unit 242, and a subtracter 243. When the control signal indicating the necessity of the cancellation process is input, the transmission signal replica generation unit 241 generates a replica (transmission signal replica) of the known signals, such as the reference signal (e.g., the CRS) and the control signal. The transmission signal replica is generated based on the "cell information of the transmission source of the signal on which the cancellation process is to be executed", which is contained in the relevant control signal.

In FIG. 1, upon receiving, from the base station device 100-2, the notification of the information indicating the necessity of the cancellation process and the cell information of the base station device 100-1 as the transmission source of the signal on which the cancellation process is to be executed, the mobile station device 200-2 and/or the mobile station device 200-3 generates a replica of the known signals (such as CRS, PSS, and SSS) in accordance with the transmission frame format (FIGS. 3 and 4) for the downlink of the base station device 100-1. In particular, the mobile station device 200-2 and/or the mobile station device 200-3 generates a replica of the known signal in the resource-mapping limited subframe.

The interference replica generation unit 242 multiplies the transmission signal replica by the channel estimation value, thereby generating an interference replica.

The subtracter 243 subtracts the generated interference replica from the frequency domain signal output from the DFT unit 205, and then outputs the frequency domain output after the subtraction to the channel compensation unit 207. A signal $\tilde{R}_{k,l}$ in the k-th subcarrier of the first OFDM symbol output from the subtracter 243 is expressed by the following formula.

[Math. 2]

$$\tilde{R}_{k,l} = R_{k,l} - \hat{R}_{k,l} \quad (2)$$

In the above formula, $R_{k,l}$ denotes a signal in the k-th subcarrier of the first OFDM symbol in the resource-mapping limited frame output from the DFT unit 205. $\hat{R}_{k,l}$ denotes an interference replica in the resource-mapping limited frame, and it is expressed by a formula given below. It is to be noted that the expressions "R^" and "R~" imply symbols, which correspond to alphabets "R" added respectively with "^" and "~" put above them, as expressed in the formula (2). Those expressions are similarly applied to "s^", "c^", and "H^" used below.

[Math. 3]

$$\hat{R}_{k,l} = \hat{H}_{k,l} \hat{s}_{k,l} \quad (3)$$

In the above formula, $\hat{H}_{k,l}$ denotes a transfer function of the k-th subcarrier of the first OFDM symbol, which has been estimated by the channel estimation unit 203. $\hat{s}_{k,l}$ denotes a replica of a transmission signal in the k-th subcarrier of the first OFDM symbol, which has been generated by the transmission signal replica generation unit 241. The $\hat{s}_{k,l}$ is a replica that is made up of the known signals (e.g., CRS, PSS, and SSS) in the resource elements where those known signals are mapped, and of 0 (null) in the other resource elements.

In the resource-mapping limited frame having the subframe format of FIG. 4, for example, a replica $\hat{s}_{k,l}$ (l=1, 8) of a transmission signal in the first and eighth OFDM symbols is expressed by the following formula.

[Math. 4]

$$\hat{s}_{k,l} = \begin{cases} \hat{c}_{RS} & (k = 6m+1) \\ 0 & (k \neq 6m+1) \end{cases} \quad (4)$$

In the above formula, m=0, 1, . . . , 2(M−1) (M is the number of resource blocks) is assumed, and $\hat{c}_{RS}$ denotes a reference signal generated by the transmission signal replica generation unit 241.

For the other OFDM symbols as well, the transmission signal replica generation unit 241 generates an interference replica by assigning, to the resource element where the known signal is mapped, a replica of the relevant known signal, and by assigning 0 to the other resource blocks. When there are a plural number of antennas, the transmission signal replica generation unit 241 generates an interference replica based on the subframe format transmitted from each antenna port.

For example, when the base station device 100-1 having two antennas performs transmission in the format illustrated in FIG. 5, a replica $\hat{s}_{k,l}$ (l=1, 5, 8, 12) of a transmission signal in the first, fifth, eighth, and twelfth OFDM symbols is expressed by the following formula.

[Math. 5]

$$\hat{s}_{k,l} = \begin{cases} \hat{c}_{RS} & (k = 3m+1) \\ 0 & (k \neq 3m+1) \end{cases} \quad (5)$$

Figure 11:
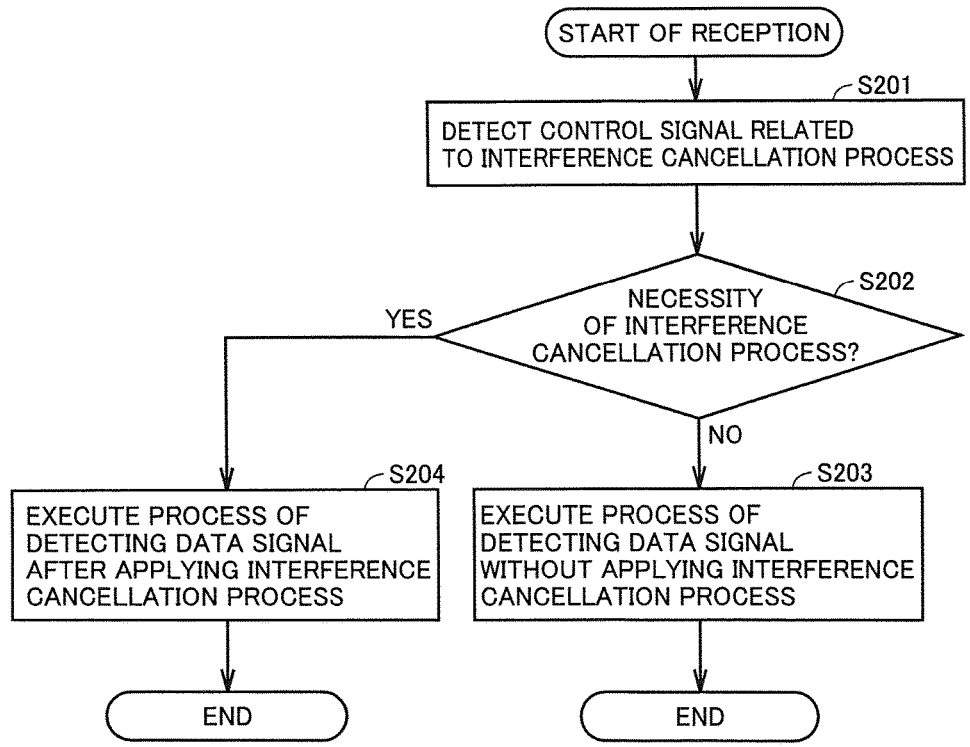
FIG. 11 is a reception flowchart for a mobile station device in the radio communication system according to the first embodiment of the present invention.

FIG. 11 is a reception flowchart for a mobile station device in the radio communication system according to the first embodiment of the present invention. In FIG. 1, the relevant mobile station device is represented as the mobile station device 200-u (u=2 and/or 3). The mobile station device 200-u detects a control signal that is contained in the signal transmitted from the base station device 100-2 and that is related to the interference cancellation process (S201), and determines the necessity or the non-necessity of the interference cancellation process based on the detected control signal (S202). If the necessity of the interference cancellation process (i.e., a flag related to the interference cancellation process being "1") is detected (YES in S202), the mobile station device 200-u executes, at predetermined timing, a process of detecting a data signal after applying the interference cancellation process to the known signal (e.g., the CRS) (S204). On the other hand, if the non-necessity of the interference cancellation process (i.e., the flag related to the interference cancellation process being "0") is detected (NO in S202), the mobile station device 200-u executes a process of detecting a data signal without applying the interference cancellation process (S203). The timing of executing the interference cancellation process, i.e., the subframe subjected to the interference cancellation process, may be determined in advance or may be notified from the base station device to the mobile station device. Moreover, information regarding the arrangement of the known signal can also be determined from other information, such as the cell information, the number of CRS ports, etc., which are contained in the control signal.

Figure 12:
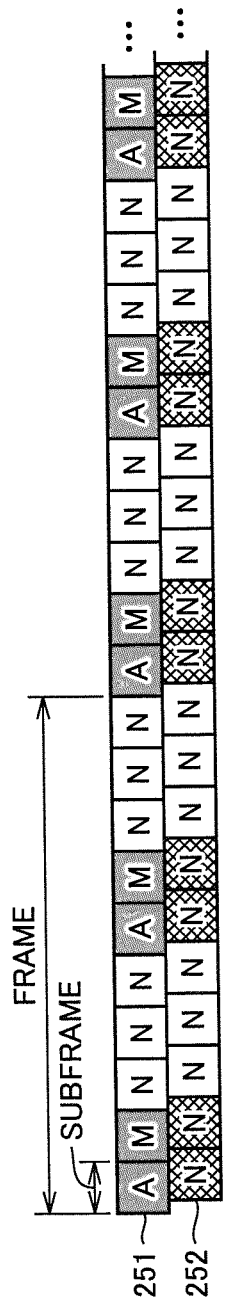
FIG. 12 illustrates reception of subframes by the mobile station device 200-2, the subframes being transmitted from the base station device 100-1 and the base station device 100-2.

FIG. 12 illustrates reception of subframes by the mobile station device 200-2, the subframes being transmitted from the base station device 100-1 and the base station device 100-2. The mobile station device 200-2 in FIG. 1 receives a signal (causing Inter-cell Interference) transmitted in a transmission frame format 251 from the base station device 100-1 and a signal transmitted in a transmission frame format 252 from the base station device 100-2. In the first embodiment of the present invention, the base station device 100-1 maps (i) the data signal (e.g., PDSCH) and the control signals (such as PDCCH, CRS, SSS, and PSS) destined for the mobile station device (i.e., the mobile station device 200-1 in FIG. 1), which is connected to the relevant base station device, to subframes N, and (ii) only the predetermined control signals (such as CRS, SSS, and PSS) to subframes A and M (i.e., the resource-mapping limited subframes denoted by filled-in portions). Furthermore, in the first embodiment of the present invention, the base station device 100-2 maps the data signal, which is transmitted to the mobile station device 200-2, to only a subframe (denoted by a double hatched portion in the transmission frame format 252) transmitted at the timing at which the subframe A is transmitted. As a result, it is possible to mitigate the Inter-cell Interference imposed on the mobile station device 200-2, which is connected to a picocell or a femtocell (e.g., the base station device 100-2), from a macrocell (e.g., the base station device 100-1).

Moreover, in the first embodiment of the present invention, the base station device 100-2 notifies, to the mobile station device 200-2, information indicating that a process of removing a predetermined control signal (CRS) transmitted from the base station device 100-1 (i.e., the cancellation process) is required (or enabled) for a subframe transmitted at the timing at which the subframe A or N is transmitted. In addition, the base station device 100-2 notifies, to the mobile station device 200-2, information indicating that the process of removing the predetermined control signal (CRS) transmitted from the base station device 100-1 (i.e., the cancellation process) is not required (or disabled) for a subframe transmitted at the timing at which the subframe M is transmitted.

The base station device 100-1 can change the number of transmission antennas or the number of layers depending on the channel state, QoS (Quality of Service) of the transmission signal, and so on. Furthermore, the number of Cell-specific Reference Signals mapped in the subframes is also different depending on the number of transmission antennas or the number of layers. As a result, an extent of the Inter-cell Interference received from the base station device 100-1 is different depending on the number of transmission antennas or the number of layers. For example, when the number of antennas is 1 (FIG. 4), eight reference signals per resource block are mapped. When the number of antennas is 2 (FIG. 5), sixteen reference signals per resource block are mapped. When the number of antennas is 4 (FIG. 6), twenty-four reference signals per resource block are mapped.

According to the first embodiment of the present invention, since the known signals, such as the reference signal and the control signal, can be removed, it is possible, in the mobile station device 200-2 connected to the picocell or the femtocell (e.g., the base station device 100-2), to further mitigate the Inter-cell interference received from the macrocell (e.g., the base station device 100-1) without being affected by the number of predetermined known signals that have been mapped in the subframe A by the macrocell.

While the foregoing description is made in connection with the case where the mobile station device executes the process of canceling the CRS, the present invention is not limited to such a case. For example, the first embodiment of the present invention can also be applied to the case where the mobile station device executes a process of canceling the synchronization signal, e.g., PSS or SSS. In that case, more specifically, the base station device notifies, to the mobile station device, the cell ID or the subframe number (including information indicating the subframe to which the synchronizing signal is mapped) with the RRC signaling.

Second Embodiment

A second embodiment of the present invention will be described below in connection with the case where, in a downlink in a radio communication system in which base station devices having different cell radii are deployed, the base station devices perform transmissions in different downlink transmission formats. A base station device 100-α and a mobile station device 200-u according to the second embodiment of the present invention have similar configurations to those of the base station device 100-α and the mobile station device 200-u according to the first embodiment, respectively, except for a control signal that is generated by the higher layer 102 and the control signal generation unit 104 to notify control information regarding the cancellation process to the mobile station device. The following description is made primarily about different points in comparison with the first embodiment.

Figure 13:
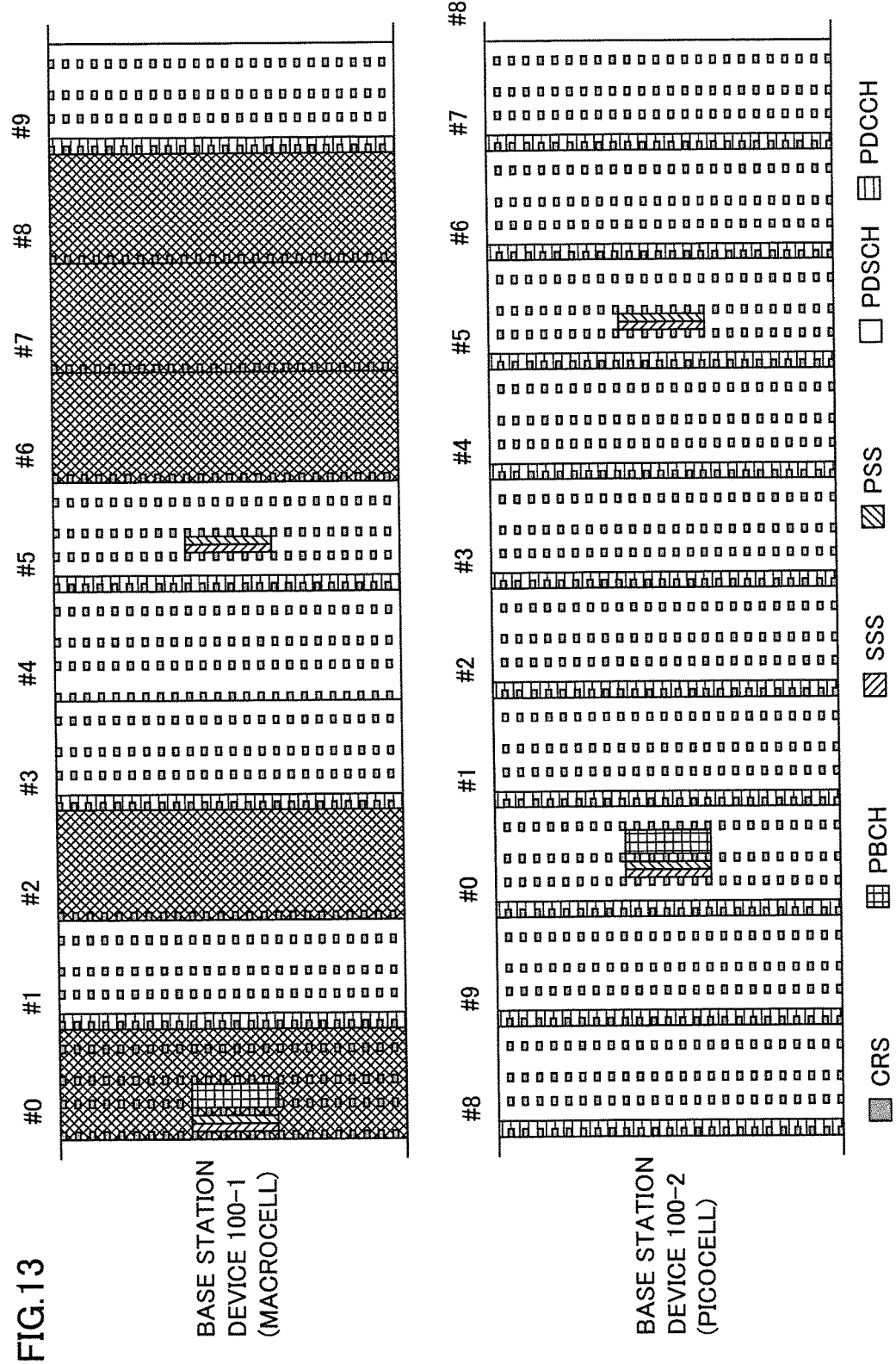
FIG. 13 illustrates a transmission frame format for a downlink of the base station device 100-1 in a radio communication system according to a second embodiment of the present invention.

FIG. 13 illustrates a transmission frame format for a downlink of the base station device 100-1 in the radio communication system according to the second embodiment of the present invention. An upper stage of FIG. 13 represents the transmission frame formant for the downlink when the base station device 100-1 transmits signals to the mobile station device 200-1 connected to the base station device 100-1. The upper stage of FIG. 13 is made up of ten subframes including the Normal Subframes, the ABS, and MBSFN subframes (Multimedia Broadcast multicast service Single Frequency Network Subframes).

The Normal Subframes (corresponding to a subframe index #1, a subframe index #3, a subframe index #4, a subframe index #5, and a subframe index #9 in the upper stage of FIG. 13) are made up of, as a general rule, the CRS (denoted by a filled-in portion in the drawing), the PDCCH (denoted by a horizontally hatched portion in the drawing), and the PDSCH (denoted by a voided portion in the drawing). In addition, control signals (such as SSS (denoted by a portion hatched by lines ascending toward the left in the drawing), and the PSS (denoted by a portion hatched by lines ascending toward the right in the drawing)) are mapped in a predetermined subframe (e.g., a subframe #5 in the upper stage of FIG. 13).

Only the CRS and/or the predetermined control signals (such as SSS, PSS, and PBCH (denoted by a latticed portion in the drawing)) are mapped in the ABS (corresponding to a subframe index #0 in the upper stage of FIG. 13). In the MBSFN subframe, the CRS is mapped (corresponding to a subframe index #2, a subframe index #6, a subframe index #7, and a subframe index #8). The number of CRSs mapped in the MBSFN subframe is smaller than that in the Normal Subframe and the ABS. In the second embodiment of the present invention, other signals (e.g., PDSCH) than the signals mentioned above as being mapped in the ABS and the MBSFN subframe are not mapped in the ABS and the MBSFN subframe (corresponding to double hatched portions in the drawing).

A lower stage of FIG. 13 represents the transmission frame formant for the downlink when the base station device 100-2 transmits signals to the mobile station device 200-2 and the mobile station device 200-3 both connected to the base station device 100-2. The lower stage of FIG. 13 is made up of ten Normal Subframes. The Normal Subframe is made up of, as a general rule, the CRS (denoted by a filled-in portion in the drawing), the PDSCH (denoted by a horizontally hatched portion in the drawing), and the PDSCH (denoted by a voided portion in the drawing). In addition, control signals (such as SSS (denoted by a portion hatched by lines ascending toward the left in the drawing), PSS (denoted by a portion hatched by lines ascending toward the right in the drawing), and PBCH (denoted by a latticed portion in the drawing)), are mapped in predetermined subframes (e.g., a subframe #0 and a subframe index #5 in the lower stage of FIG. 13).

The control signal generation unit 104 of the base station device 100-2 according to the second embodiment of the present invention generates the control signal, which includes the information indicating the necessity or the non-necessity of the cancellation in the mobile station device and/or the cell for which the cancellation is to be executed, taking into consideration the transmission format set by the base station device 100-1 and illustrated in the upper stage of FIG. 13.

In one example, the information indicating the necessity or the non-necessity of the cancellation is set to (i) notify the non-necessity of the cancellation process for the subframe in which the MBSFN subframe is transmitted from the base station device 100-1, and (ii) to notify the necessity of the cancellation process for the subframe in which the Normal Subframe and/or the ABS subframe is transmitted from the base station device 100-1. The base station device 100-2 prepares, for example, a 1-bit area for indicating the information regarding the necessity or the non-necessity of the interference cancellation in the PDCCH or the RRC signaling, and it notifies the non-necessity of the cancellation process by setting "0" in that area and the necessity of the cancellation process by setting "1" in that area.

Upon receiving the control signal that includes the information indicating the necessity or the non-necessity of the cancellation, the mobile station device 200-2 and/or the mobile station device 200-3 executes the cancellation process on the subframe based on the information indicating the necessity or the non-necessity of the cancellation.

In another example, the information indicating the necessity or the non-necessity of the cancellation notifies the arrangement of the Normal Subframe, the MBSFN subframe, and the ABS Subframe in the format transmitted from the base station device 100-1. The base station device 100-2 prepares, for example, a 2-bit area for indicating the information regarding the necessity or the non-necessity of the interference cancellation in the PDCCH or the RRC signaling, and it notifies the Normal Subframe by setting "01" in that area, the MBSFN subframe by setting "10" in that area, and the ABS by setting "11" in that area.

The mobile station device 200-2 and/or the mobile station device 200-3 having received the control signal, which includes the information indicating the necessity or the non-necessity of the cancellation, executes the cancellation process on the relevant subframe upon obtaining the information "01" and/or "11" each indicating the necessity or the non-necessity of the cancellation, and then executes the demodulation process, the decoding process, etc.

On the other hand, when the mobile station device 200-2 and/or the mobile station device 200-3 obtains the information "10" indicating the necessity or the non-necessity of the cancellation, it executes the demodulation process, the decoding process, etc. without executing the cancellation process on the relevant subframe. It is to be noted that the information regarding the cell for which the cancellation is to be executed is notified in the same manner as in the first embodiment.

According to the second embodiment of the present invention, as described above, when the macrocell (e.g., the base station device 100-1) transmits signals in the transmission format constituted by plural types of subframes, the picocell or the femtocell (e.g., the base station device 100-2) can set the information indicating the necessity or the non-necessity of the cancellation depending on the number of the known signals, such as the Cell-specific Reference Signals.

The mobile station device connected to the picocell or the femtocell can remove the known signals, such as the reference signal and the control signal, based on the information indicating the necessity or the non-necessity of the cancellation, and hence further mitigate the Inter-cell Interference, which is received from the macrocell, without being affected by the number of the known signals.

Third Embodiment

A third embodiment of the present invention will be described below in connection with another notifying method for executing the control related to the cancellation process by a mobile station device in a downlink in a radio communication system in which base station devices having different cell radii are deployed. A base station device 100-α and a mobile station device 200-u according to the third embodiment of the present invention have similar configurations to those of the base station device 100-α and the mobile station device 200-u according to the first embodiment, respectively, except for a control signal that is generated by the higher layer 102 and the control signal generation unit 104 to notify control information regarding the cancellation process to the mobile station device. The following description is made primarily about different points in comparison with the first embodiment.

A downlink control signal according to the third embodiment of the present invention includes information indicating the subframe on which the cancellation process is to be executed in the mobile station device. The control signal corresponds to the PDCCH or the RRC signaling.

FIG. 14 illustrates one example of the downlink control signal according to the third embodiment of the present invention. The control signal includes information (bit map) regarding subframes on which the cancellation process is to be executed in the mobile station device 200-u. FIG. 14 illustrates the case where 10 bits are mapped to the control signal as the information regarding the subframes to be subjected to the cancellation process. In FIG. 14, "1" represents the necessity of the cancellation process, and "0" represents the non-necessity of the cancellation process. The example of FIG. 14 notifies that the cancellation process is executed on the first, second, sixth, and seventh subframes among ten subframes constituting a frame. When the mobile station device 200-u receives the control signal including the information regarding the subframes to be subjected to the cancellation process, the interference removing unit 206 executes, based on the received information, the interference removing process (cancellation process) on the subframe for which the necessity of the cancellation process is indicated.

Furthermore, the downlink control signal according to the third embodiment of the present invention includes information regarding cells on which the cancellation process is to be executed in the mobile station device. The control signal corresponds to the PDCCH or the RRC signaling. FIG. 14 illustrates the case where 8 bits are mapped as the cell information to the control signal. In other words, a number 256 of cell IDs can be notified at maximum. In the example of FIG. 14, it is notified that the cell ID of the base station device for which the cancellation process is to be executed is "1". Upon receiving the control signal including the cell ID of the base station device for which the cancellation process is to be performed, the control signal detection unit 211 of the mobile station device 200-u extracts, from the control signal, the cell ID of the base station device for which the cancellation process is to be performed, and obtains information regarding resource elements in each of which the CRS from the base station device to be subjected to the cancellation process is mapped. Based on the information regarding the resource elements in each of which the CRS from the base station device to be subjected to the cancellation process is mapped, the interference removing unit 206 executes the interference removing process on the CRS in the subframe element for which the necessity of the cancellation process is indicated.

Moreover, the downlink control signal according to the third embodiment of the present invention includes information regarding the number of layers of a signal on which the cancellation process is to be executed in the mobile station device. The control signal corresponds to the PDCCH or the RRC signaling. FIG. 14 illustrates the case where 4 bits are mapped, as the information regarding the number of layers, to the control signal. In other words, a number 16 of layers can be notified at maximum. The example of FIG. 14 notifies that the number of layers of the signal transmitted from the base station device for which the cancellation process is to be executed is 1. Upon receiving the control signal that includes the information indicating the number of layers of the signal transmitted from the base station device for which the cancellation process is to be executed is 1, the control signal detection unit 211 of the mobile station device 200-u extracts the number-of-layer information and obtains information regarding resource elements in each of which the CRS in the signal transmission in the relevant number of layers is mapped. Based on the information regarding the resource elements in each of which the CRS from the base station device to be subjected to the cancellation process is mapped, the interference removing unit 206 executes the interference removing process on the CRS in the subframe for which the necessity of the cancellation process is indicated.

While the information regarding the subframe to be subjected to the cancellation process, the cell information, and the number of layers of the subframe to be subjected to the cancellation process are notified using the same control signal in FIG. 14, different control signals may be used to notify them. Furthermore, the above-described RRC signaling may be transmitted with the PBCH or the PDSCH. When the information indicating the necessity or the non-necessity of the interference cancellation process or the cell information to execute the interference cancellation process is notified with the downlink control signal by employing the RRC signaling transmitted with the PBCH, the relevant information can be notified in a Cell-Specific way. When the information indicating the necessity or the non-necessity of the interference cancellation process or the cell information to execute the interference cancellation process is notified with the downlink control signal by employing the RRC signaling transmitted with the PDSCH, the relevant information can be notified in a UE-Specific way.

According to the third embodiment of the present invention, as described above, the necessity or the non-necessity of the cancellation process can be notified to the mobile station device per subframe. As a result, the mobile station device can execute the interference cancellation process at highly-accurate timing.

Fourth Embodiment

A fourth embodiment of the present invention will be described below in connection with still another notifying method for executing the control related to the cancellation process by a mobile station device in a downlink in a radio communication system in which base station devices having different cell radii are deployed. A base station device 100-α and a mobile station device 200-u according to the fourth embodiment of the present invention have similar configurations to those of the base station device 100-α and the mobile station device 200-u according to the first embodiment, respectively, except for a control signal that is generated by the higher layer 102 and the control signal generation unit 104 the base station device 100-α, and that includes control information regarding the cancellation process. The following description is made primarily about different points in comparison with the first embodiment.

FIG. 15 illustrates one example of a downlink control signal for a base station device according to the fourth embodiment of the present invention. The downlink control signal corresponds to, e.g., the PDSCH. MCS information is included in the downlink control signal according to the fourth embodiment of the present invention. FIG. 15 illustrates an example in which 4 bits are mapped as an area for indicating the MCS information.

FIG. 16 illustrates a modulation scheme and a coding rate with respect to an index of the MCS information. More specifically, the MCS information in FIG. 15 corresponds to Index 3 in FIG. 16. The base station device 100-2 modulates a data signal (PDSCH) in accordance with the MCS information set as illustrated in FIGS. 15 and 16, and transmits the modulated data signal to the mobile station device 200-u (u=2, 3 in FIG. 1).

The downlink control signal according to the fourth embodiment of the present invention further includes transmission format information. The base station device 100-2 maps the data signal (PDSCH) in accordance with the transmission format information from the base station device 100-1. FIG. 15 illustrates an example in which 2 bits are mapped as an area for indicating the transmission format information.

Figures 17, 18:
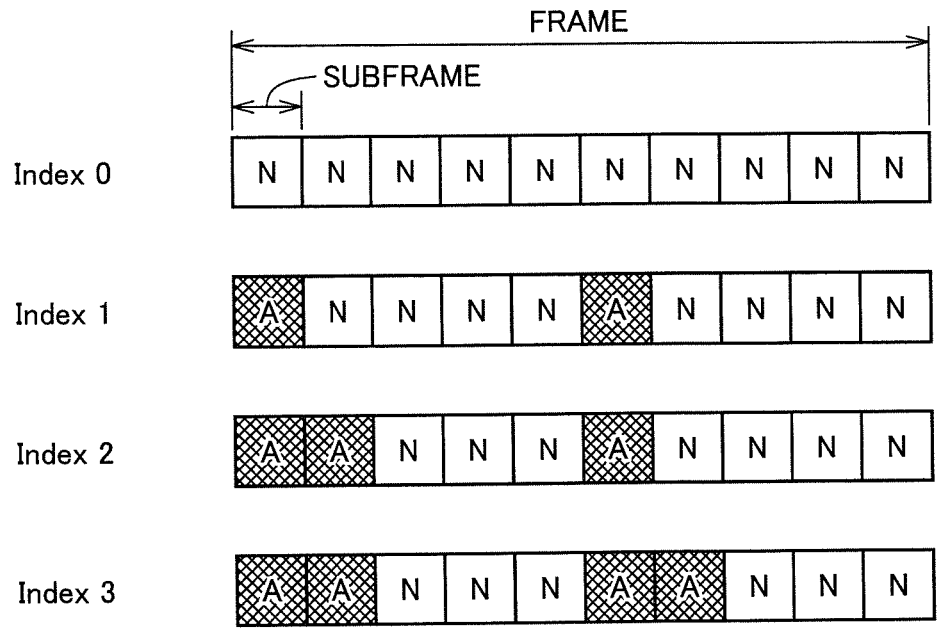
FIG. 17 illustrates a subframe configuration with respect to an index of transmission format information.
FIG. 18 illustrates one example of a necessity/non-necessity decision table for a canceller operation, which is held in a mobile station device according to the fourth embodiment of the present invention.

FIG. 17 illustrates a subframe configuration with respect to an index of the transmission format information. More specifically, the transmission format information in FIG. 15 corresponds to Index 2 in FIG. 17. When the index of the transmission format information is 2, the base station device 100-2 maps the data signal (PDSCH), destined for the mobile station device 200-u (u=2, 3 in FIG. 1), to the first, second, and sixth subframes. While the information regarding the subframe to be subjected to the cancellation process, the cell information, and the number of layers of the subframe to be subjected to the cancellation process are notified using the same control signal in FIG. 14, different control signals may be used to notify them.

The operation of the mobile station device according to the fourth embodiment of the present invention will be described below. The mobile station device 200-u extracts the MCS information and the transmission format information from the control signal transmitted from the base station device 100-2, and determines the necessity or the non-necessity of the cancellation process based on a necessity/non-necessity decision table for a canceller operation.

FIG. 18 illustrates one example of the necessity/non-necessity decision table for the canceller operation, which is held in the mobile station device according to the fourth embodiment of the present invention. When the index of the transmission format information is 0, or when the index of the transmission format information is 1 and the index of the MCS information is 0 to 6, the control signal detection unit 211 determines that the cancellation process is not necessary. When the index of the transmission format information is 1 and the index of the MCS information is 7 to 15, the control signal detection unit 211 determines that the cancellation process is necessary, and notifies the necessity of the cancellation process to the interference removing unit 206.

Figure 19:
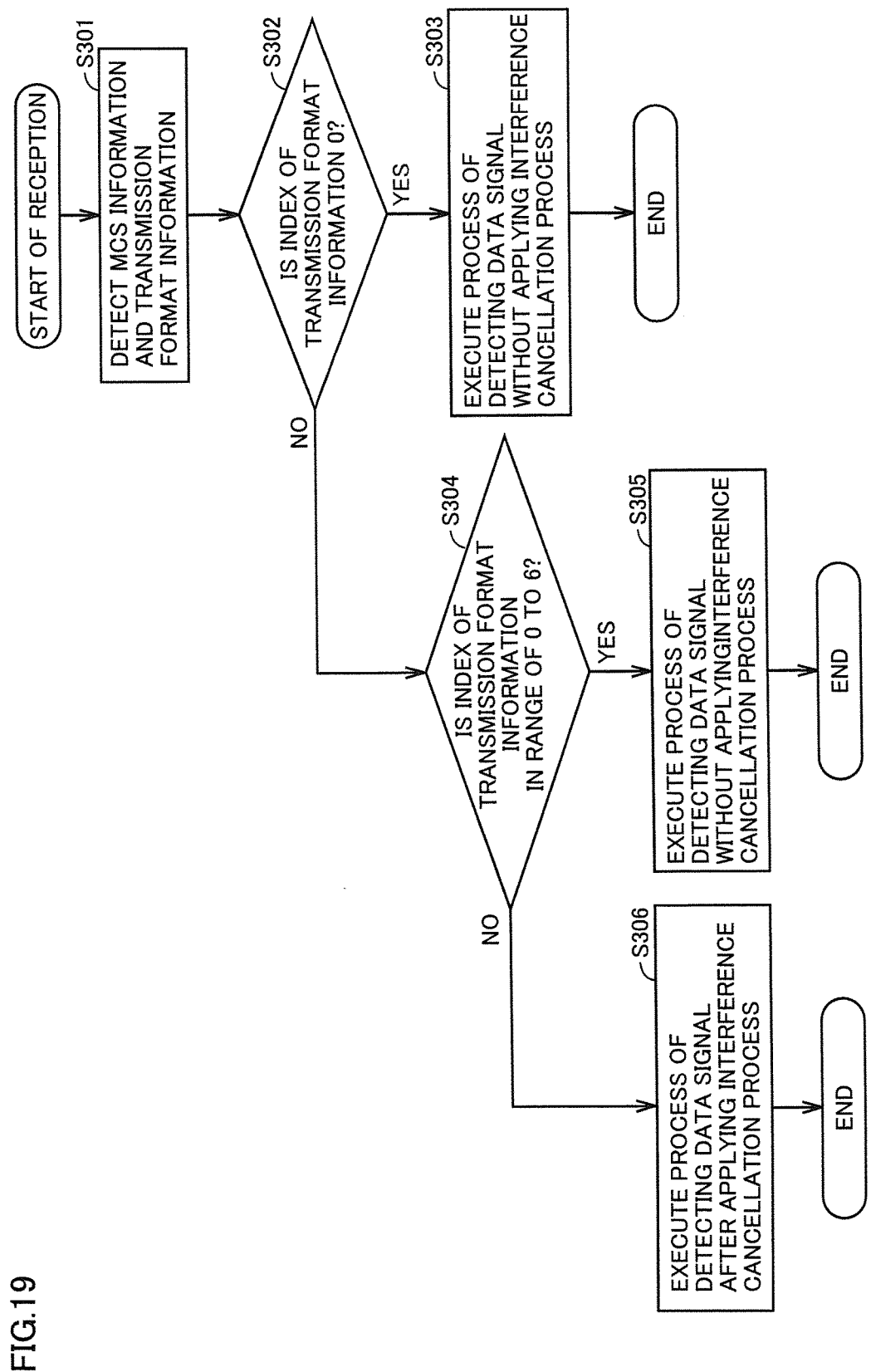
FIG. 19 is a flowchart with which the mobile station device in a radio communication system according to the fourth embodiment of the present invention determines propriety of the canceller operation.

FIG. 19 is a flowchart with which the mobile station device in the radio communication system according to the fourth embodiment of the present invention determines propriety of the canceller operation. In FIG. 19, the mobile station device is assumed to be the mobile station device 200 (u=2 and/or 3).

The control signal detection unit 211 of the mobile station device 200-$u$ extracts the MCS information and the transmission format information from the control signal that is contained in the signal transmitted from the base station device 100-2 (S301), and identifies the index of the transmission format information (S302). If the index of the transmission format information is 0 (YES in S302), the mobile station device 200-$u$ executes, based on the MCS information, a process of detecting a data signal without applying the interference cancellation process (S303).

If the index of the transmission format information is not 0 (NO in S302), the mobile station device 200-$u$ identifies the index of the MCS information (S304). If the index of the MCS information is 0 to 6 (YES in S304), the mobile station device 200-$u$ executes, based on the MCS information, a process of detecting a data signal without applying the interference cancellation process (S305).

If the index of the MCS information is not 0 to 6 (NO in S304), the mobile station device 200-$u$ executes, based on the MCS information, a process of detecting a data signal after executing, based on the transmission format information, the interference cancellation process on the known signal (e.g., CRS), which has been transmitted from the base station device 100-1 in the ABS (S306). The resource element in which the known signal to be subjected to the cancellation process can also be determined from other information, such as the cell information, the number of CRS ports, etc., which are contained in the control signal.

According to the fourth embodiment of the present invention, as described above, the mobile station device can implicitly determine the necessity or the non-necessity of the cancellation process based on the MCS information and the transmission format information. As a result, there is no need of adding a new control signal for determining the necessity or the non-necessity of the cancellation process. It is hence possible to suppress reduction of the frequency usage efficiency, which would be caused with an increase in the number of control signals.

While, in the above embodiment of the present invention, the necessity or the non-necessity of the cancellation process is implicitly determined based on the MCS information and the transmission format information, the necessity or the non-necessity of the cancellation process may be implicitly determined based on other control information (e.g., RI or PMI).

Fifth Embodiment

A fifth embodiment of the present invention described below relates to generation of feedback information by a mobile station device, which has the function of cancellation process, in a downlink in a radio communication system in which base station devices having different cell radii are deployed.

A base station device 100-α and a mobile station device 200-$u$ according to the fifth embodiment of the present invention have similar configurations to those of the base station device 100-α and the mobile station device 200-$u$ according to the first embodiment, respectively, except for a method of generating the feedback information by the higher layer 102 and the control signal generation unit 104 of the mobile station device 200-$u$. The following description is made primarily about different points in comparison with the first embodiment.

Figure 20:
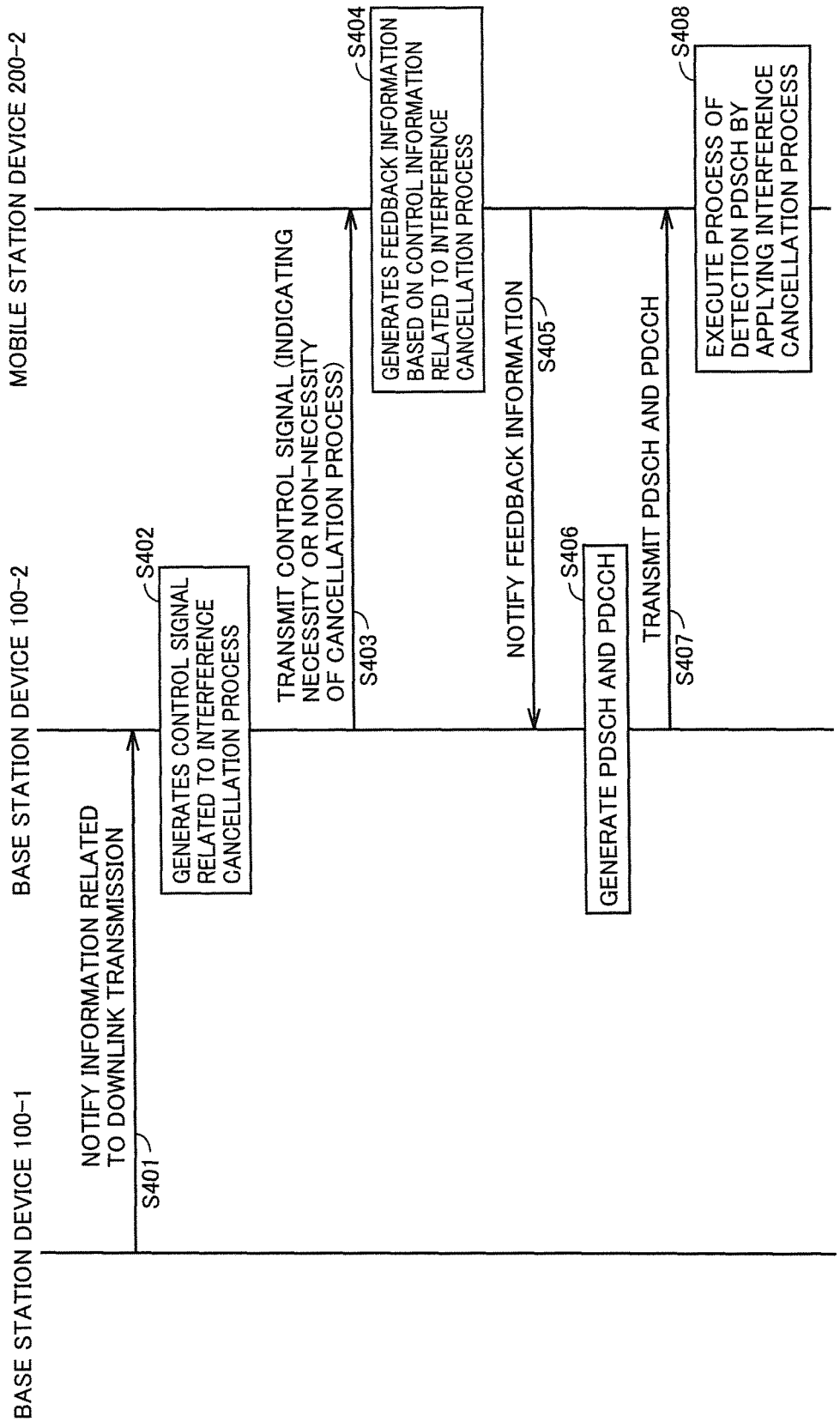
FIG. 20 is a sequence diagram illustrating connection between the base station device and the mobile station device and a control process flow in the radio communication system according to the present invention.

FIG. 20 is a sequence diagram illustrating connection between the base station device and the mobile station device and a control process flow in the radio communication system according to the fifth embodiment of the present invention. The base station device 100-1 notifies, to the peripheral base station device 100-2, information related to downlink transmission from the base station device 100-1 through the backhaul link 10 in FIG. 1 (S401). The information related to the downlink transmission includes the transmission format information indicating, e.g., the arrangement of the Normal Subframe and/or the resource-mapping limited subframe, the cell ID, the number of CRS ports, etc.

The base station device 100-2 generates a control signal, which includes control information related to the cancellation process, based on the information related to downlink transmission (S402), and transmits the generated control signal to the mobile station device 200-2 (S403). The control information related to the cancellation process includes the information indicating the necessity or the non-necessity of the interference cancellation process, the cell information to execute the interference cancellation, and so on. Signaling of the control information related to the cancellation process can be performed by employing the signaling method described above in the first to fourth embodiments. The mobile station device 200-2 generates the feedback information based on the control information related to the cancellation process (S404), and notifies the generated feedback information to the base station device 100-2 (S405).

Figure 21:
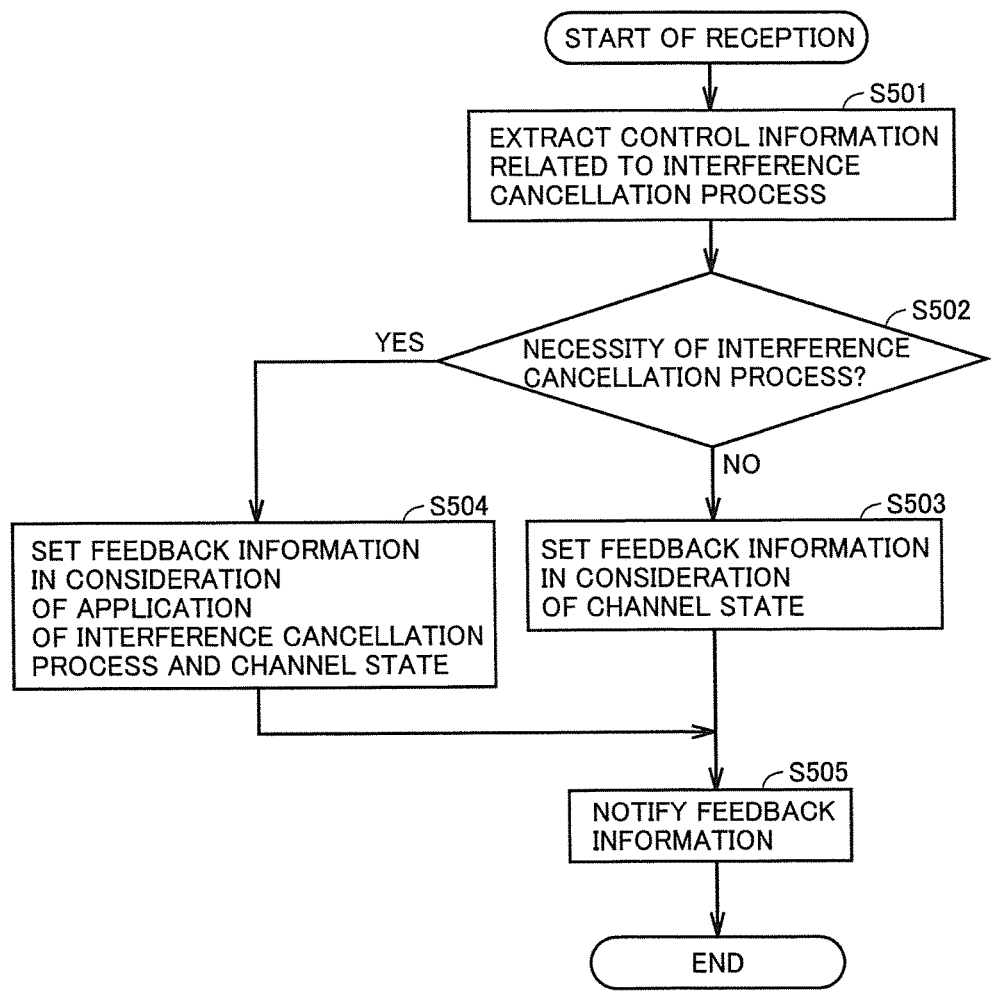
FIG. 21 is a flowchart illustrating generation of feedback information in a fifth embodiment of the present invention.
Figure 22:
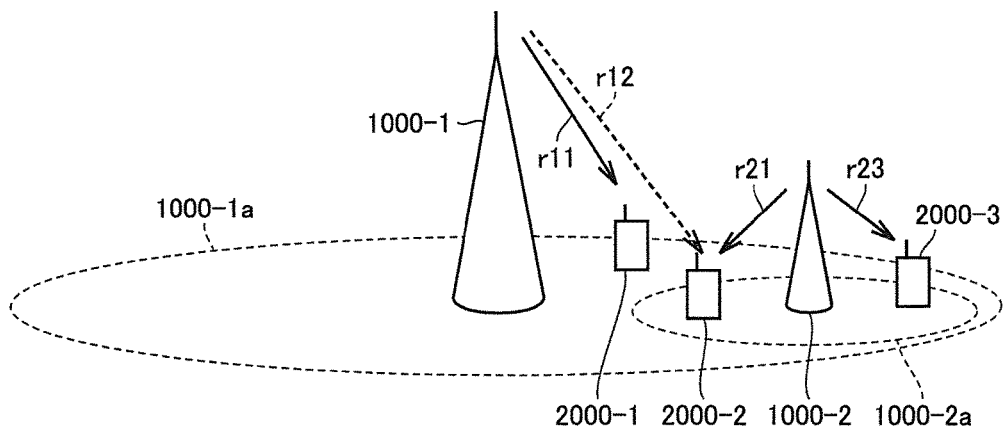
FIG. 22 is a schematic view illustrating one example of a downlink in a radio communication system in which base station devices having different cell radii are deployed.

FIG. 21 is a flowchart illustrating the generation of the feedback information in the fifth embodiment of the present invention. The control signal detection unit 211 of the mobile station device 200-2 extracts the control information related to the interference cancellation process from the downlink control signal transmitted from the base station device 100-1, and obtains the information indicating the necessity or the non-necessity of the interference cancellation process (S501). If the necessity of the interference cancellation process is notified (YES in S502), the mobile station device 200-2 sets the feedback information, such as the CQI and the RI, in consideration of not only the channel state, but also application of the interference cancellation process (S504).

On the other hand, if the non-necessity of the interference cancellation process is notified (NO in S502), the mobile station device 200-2 sets the feedback information, such as the CQI and the RI, based on the channel state (S503). The mobile station device 200-2 then notifies the set feedback information to the base station device 100-2 (S505). It is to be noted that the channel state is estimated from the reference signal, e.g., the CRS, transmitted from the base station device 100-2.

Returning to FIG. 20, the base station device 100-2 sets, based on the feedback information, the MCS, the number of layers, etc. of a data signal transmitted to the mobile station device 200-2, and generates the PDSCH by executing the coding process, the modulation process, the precoding process, etc. based on the above-mentioned parameters (S406). The base station device 100-2 further generates the Physical Downlink Control Channel (PDCCH) for notifying the MCS, the number of layers, etc. (S406). Thereafter, the base station device 100-2 transmits the PDSCH and the PDCCH to the mobile station device 200-2 (S407).

Upon receiving the PDSCH and the PDCCH, the mobile station device 200-2 executes a PDSCH detection process (including the demodulation process and the decoding process) by applying the interference cancellation process based on the information, such as the MCS and the number of layers, which are set in the PDCCH (S408).

According to the fifth embodiment of the present invention, as described above, the mobile station device generates the feedback information in consideration of not only the channel state, but also the necessity or the non-necessity of application of the interference cancellation process. The base station device transmits the data signal to the mobile station device based on the feedback information.

Thus, since the base station device 100-2 can set the MCS and the number of layers (spatial multiplexing number) to be adaptable for high-speed transmission of the data signal, the frequency usage efficiency can be increased.

A program for realizing the functions of the whole or a part of the base station device illustrated in FIG. 2 or the whole or a part of the terminal device illustrated in FIG. 9 may be recorded on a computer-readable recording medium, and the processes in various components may be carried out by causing a computer system to read and execute the program recorded on the recording medium. The term "computer system" used herein includes an OS and hardware such as peripheral devices.

In the case utilizing the WWW (World Wide Web) system, the "computer system" includes environments for presenting homepages (or display environments).

Moreover, the term "computer-readable recording medium" implies a storage device including a portable medium, such as a flexible disk, a magneto-optical disk, a ROM (Read Only Memory), or a CD (Compact Disc)-ROM, and a hard disk incorporated in the computer system. The "computer-readable recording medium" further includes not only a component that dynamically holds the program for a short time, like a communication line, when the program is transmitted via a network, such as the Internet, or a communication line, such as a telephone line, but also a device that holds the program for a certain time, like a volatile memory in the computer system serving as a server or a client in the above-mentioned case. The above-mentioned program may realize a part of the above-mentioned functions, or may realize the above-mentioned functions in combination with programs already recorded in the computer system.

Alternatively, the whole or a part of the functions of the base station device illustrated in FIG. 2 or the whole or a part of the functions of the terminal device illustrated in FIG. 9 may be realized in the form integrated into an integral circuit. Various functional blocks of the base station device and the terminal device may be individually realized in the form of chips, or a part or the whole of those functional blocks may be integrated into the form of a chip. A method of realizing the integral circuit is not limited to the use of an LSI, and the method may be realized by employing a dedicated circuit or a universal processor. In addition, if a technique of realizing an integral circuit instead of the LSI technique appears with the progress of the semiconductor technology, the integral circuit using such a technique can also be used.

While the embodiments of the present invention have been described in detail above with reference to the drawings, practical configurations are not limited to those described in the above embodiments, and the present invention involves changes in design within a scope not departing from the gist of the present invention.

APPENDIX (1) According to one aspect of the present invention, there is provided a base station device in a radio communication system in which the base station device communicates with a mobile station device, wherein the base station device notifies, to the mobile station device, information indicating that a reference signal transmitted from another base station device and being specific to the other base station device is to be cancelled.

(2) According to another aspect of the present invention, there is provided a base station device in a radio communication system in which plural base station devices having different cell radii are deployed, wherein the base station device includes an higher layer for scheduling an information data signal, a control signal, and a reference signal in accordance with a transmission frame format that is transmitted to a mobile station device from another base station device in the radio communication system, and that is made up of plural types of subframes, a resource mapping unit for mapping the information data signal, the control signal, and the reference signal as subframe resources based on the scheduling, and a transmission unit for transmitting subframes containing the information data signal, the control signal, and the reference signal to the mobile station device, the control signal containing information indicating necessity or non-necessity of a cancellation process in the mobile station device.

(3) A base station device according to still another aspect of the present invention is constituted such that, in the base station device described in above (2), the information indicating the necessity or the non-necessity of the cancellation process contains information notifying the subframe on which the cancellation process is to be executed, based on the type of the subframe constituting the transmission frame format.

(4) A base station device according to still another aspect of the present invention is constituted such that, in the base station device described in above (3), the necessity or the non-necessity of the cancellation process is set for the subframe on which the cancellation process is to be executed, in consideration of the reference signal contained in the relevant subframe.

(5) A base station device according to still another aspect of the present invention is constituted such that, in the base station device described in above (2), the transmission frame format is made up of a limited subframe containing only a predetermined reference signal or control signal, and a normal subframe containing the information data signal, the control signal, and the reference signal, and the information indicating the necessity or the non-necessity of the cancellation process is indicates that the cancellation process is to be executed on the subframe transmitted from the transmission unit at timing at which the limited subframe is transmitted.

(6) A base station device according to still another aspect of the present invention is constituted such that, in the base station device described in above (5), the limited subframe is an MBSFN subframe in which a multicast signal or a broadcast signal is transmitted, or an ABS subframe in which the information data signal is transmitted to a particular mobile station device.

(7) A base station device according to still another aspect of the present invention is constituted such that, in the base station device described in above (2), the information indicating the necessity or the non-necessity of the cancellation process is contained in the control signal as a bit map indicating the necessity or the non-necessity of the cancellation process per subframe.

(8) A base station device according to still another aspect of the present invention is constituted such that, in the base station device described in above (2), the higher layer receives, from the other base station device, notification of the transmission frame format for the other base station device.

(9) According to still another aspect of the present invention, there is provided a mobile station device in a radio communication system in which plural base station devices having different cell radii are deployed, the mobile station device including a reception unit for receiving subframes transmitted from the base station device, a control signal extraction unit for extracting a control signal from the subframes, and an interference removing unit for executing a cancellation process on the subframes, wherein the interference removing unit executes the cancellation process on the subframes in accordance with a transmission frame format that is transmitted from another base station device in the radio communication system except for the aforesaid base station device, and that is made up of plural types of subframes.

(10) A base station device according to still another aspect of the present invention is constituted such that, in the base station device described in above (9), the interference removing unit removes a reference signal transmitted from the aforesaid other base station device.

(11) A base station device according to still another aspect of the present invention is constituted such that, in the base station device described in above (9), the subframes transmitted from the base station device include a control signal that contains information indicating necessity or non-necessity of a cancellation process, the control signal detection unit extracts, from the subframes, the information indicating necessity or non-necessity of a cancellation process, and the interference removing unit executes the cancellation process based on the information indicating the necessity or the non-necessity of the cancellation process.

(12) A base station device according to still another aspect of the present invention is constituted such that, in the base station device described in above (9), the subframes transmitted from the base station device include a control signal that contains information regarding an information data signal, the control signal detection unit extracts, from the subframes, the information regarding the information data signal, and the interference removing unit executes the cancellation process based on the information regarding the information data signal.

(13) A base station device according to still another aspect of the present invention is constituted such that, in the base station device described in above (9), the control signal detection unit extracts, from the subframes, information regarding a modulation scheme and a coding rate of the information data signal, and the interference removing unit executes the cancellation process depending on a predetermined modulation scheme and a predetermined coding rate.

(14) According to still another aspect of the present invention, there is provided a radio communication system in which plural base station devices having different cell radii are deployed, wherein the base station device includes an higher layer for scheduling an information data signal, a control signal, and a reference signal in accordance with a transmission frame format that is transmitted to a mobile station device from another base station device in the radio communication system, and that is made up of plural types of subframes, a resource mapping unit for mapping the information data signal, the control signal, and the reference signal as subframe resources based on the scheduling, and a transmission unit for transmitting subframes containing the information data signal, the control signal, and the reference signal to the mobile station device, and wherein the mobile station device includes a reception unit for receiving the subframes transmitted from the base station device, a control signal extraction unit for extracting the control signal from the subframes, and an interference removing unit for executing a cancellation process on the subframes in accordance with the transmission frame format that is transmitted from the aforesaid other base station device in the radio communication system except for the aforesaid base station device, and that is made up of the plural types of subframes.

(15) According to still another aspect of the present invention, there is provided a transmission method for a base station device in a radio communication system in which plural base station devices having different cell radii are deployed, wherein the base station device executes the transmission method including the steps of scheduling an information data signal, a control signal, and a reference signal in accordance with a transmission frame format that is transmitted to a mobile station device from another base station device in the radio communication system, and that is made up of plural types of subframes, mapping the information data signal, the control signal, and the reference signal as subframe resources based on the scheduling, and transmitting subframes containing the information data signal, the control signal, and the reference signal to the mobile station device, the control signal containing information indicating necessity or non-necessity of a cancellation process in the mobile station device.

(16) According to still another aspect of the present invention, there is provided a reception method for a mobile station device in a radio communication system in which plural base station devices having different cell radii are deployed, wherein the mobile station device executes the reception method including the steps of receiving subframes transmitted from the base station device, extracting a control signal from the subframes, and executing a cancellation process on the subframes, wherein the step of executing the cancellation process executes the cancellation process in accordance with a transmission frame format that is transmitted from another base station device in the radio communication system except for the aforesaid base station device, and that is made up of plural types of subframes.

(17) According to still another aspect of the present invention, there is provided a communication method in a radio communication system in which plural base station devices having different cell radii are deployed, wherein the base station device executes the steps of scheduling an information data signal, a control signal, and a reference signal in accordance with a transmission frame format that is transmitted to a mobile station device from another base station device in the radio communication system, and that is made up of plural types of subframes, mapping the information data signal, the control signal, and the reference signal as subframe resources based on the scheduling, and transmitting subframes containing the information data signal, the control signal, and the reference signal to the mobile station device, and wherein the mobile station device executes the steps of receiving the subframes transmitted from the base station device, extracting the control signal from the subframes, and executing a cancellation process on the subframes in accordance with the transmission frame format that is transmitted from the aforesaid other base station device in the radio communication system except for the aforesaid base station device, and that is made up of the plural types of subframes.

INDUSTRIAL APPLICABILITY

The present invention can be suitably applied to a radio base station device, a radio terminal device, a radio communication system, and a radio communication method.

REFERENCE SIGNS LIST 100-1, 100-2 base station devices, 200-1, 200-2, 200-3 mobile station devices, 101 transmission antenna unit, 102 higher layer, 103 symbol generation unit, 104 control signal generation unit, 105 reference signal generation unit, 106 resource mapping unit, 107 IDFT unit, 108 GI insertion unit, 109 transmission unit, 111 coding unit, 112 modulation unit, 121 reception antenna unit, 122 reception unit, 123 control signal detection unit, 201 reception antenna unit, 202 reception unit, 203 channel estimation unit, 204 GI removing unit, 205 DFT unit, 206 interference removing unit, 207 channel compensation unit, 208 demodulation unit, 209 decoding unit, 210 higher layer, 211 control signal detection unit, 221 transmission antenna unit, 222 transmission unit, 223 control signal generation unit, 241 transmission signal replica generation unit, 242 interference replica generation unit, 243 subtracter, 251, 252 transmission frame formats, 1000-1, 1000-2 base station devices, and 2000-1, 2000-2, 2000-3 mobile station devices.

The invention claimed is:
1. A base station device communicating with a mobile station device in a first cell, the base station device comprising:
   transmitter circuitry that notifies, to the mobile station device by Radio Resource Control (RRC) signaling, assistance information concerning a frequency of the first cell; wherein
   the assistance information is information on a cell-specific reference signal (CRS) of another cell,
   the assistance information includes a cell ID, the number of antenna ports for the CRS, and subframe information indicating subframes that are reserved for Multimedia Broadcast multicast service Single Frequency Network (MBSFN), and
   the assistance information is used by the mobile station device to mitigate interference caused by the CRS while data demodulation is being performed by the mobile station device.
2. The base station device according to claim 1, wherein the another cell is a neighbor cell of the first cell.
3. The base station device according to claim 1, wherein the subframes that are reserved for MBSFN include an OFDM symbol area in which the CRS is mapped, and an OFDM symbol area in which the CRS is not mapped.
4. The base station device according to claim 1, wherein the subframe information contains a bitmap indicating MBSFN subframe allocation in a predetermined number of subframes.
5. A mobile station device communicating with a base station device in a first cell, the mobile station device comprising:
   receiver circuitry that receives, from the base station device by Radio Resource Control (RRC) signaling, assistance information concerning a frequency of the first cell; wherein
   the assistance information is information on a cell-specific reference signal (CRS) of another cell,
   the assistance information includes a cell ID, the number of antenna ports for the CRS, and subframe information indicating subframes that are reserved for Multimedia Broadcast multicast service Single Frequency Network (MBSFN), and
   the assistance information is used by the mobile station device to mitigate interference caused by the CRS while the mobile station device is performing data demodulation.
6. The mobile station device according to claim 5, wherein
   the another cell is a neighbor cell of the first cell.
7. The mobile station device according to claim 5, wherein
   the subframes that are reserved for MBSFN include an OFDM symbol area in which the CRS is mapped, and an OFDM symbol area in which the CRS is not mapped.
8. The mobile station device according to claim 5, wherein
   the subframe information contains a bitmap indicating MBSFN subframe allocation in a predetermined number of subframes.
9. A transmission method in a base station device communicating with a mobile station device in a first cell, the transmission method comprising the step of:
   notifying, to the mobile station device by Radio Resource Control (RRC) signaling, assistance information concerning a frequency of the first cell; wherein
   the assistance information is information on a cell-specific reference signal (CRS) of another cell,
   the assistance information includes a cell ID, the number of antenna ports for the CRS, and subframe information indicating subframes that are reserved for Multimedia Broadcast multicast service Single Frequency Network (MBSFN), and
   the assistance information is used by the mobile station device to mitigate interference caused by the CRS while data demodulation is being performed by the mobile station device.
10. The transmission method according to claim 9, wherein the another cell is a neighbor cell of the first cell.
11. The transmission method according to claim 9, wherein the subframes that are reserved for MBSFN include an OFDM symbol area in which the CRS is mapped, and an OFDM symbol area in which the CRS is not mapped.

12. The transmission method according to claim 9, wherein the subframe information contains a bitmap indicating MBSFN subframe allocation in a predetermined number of subframes.

13. A reception method in a mobile station device communicating with a base station device in a first cell, the reception method comprising the step of:

receiving, from the base station device by Radio Resource Control (RRC) signaling, assistance information concerning a frequency of the first cell; wherein the assistance information is information on a cell-specific reference signal (CRS) of another cell, the assistance information includes a cell ID, the number of antenna ports for the CRS, and subframe information indicating subframes that are reserved for Multimedia Broadcast multicast service Single Frequency Network (MBSFN), and the assistance information is used by the mobile station device to mitigate interference caused by the CRS while data demodulation is being performed by the mobile station device.

14. The reception method according to claim 13, wherein the another cell is a neighbor cell of the first cell.

15. The reception method according to claim 13, wherein the subframes that are reserved for MBSFN include an OFDM symbol area in which the CRS is mapped, and an OFDM symbol area in which the CRS is not mapped.

16. The reception method according to claim 13, wherein the subframe information contains a bitmap indicating MBSFN subframe allocation in a predetermined number of subframes.

17. The base station device according to claim 1, wherein the CRS is used to demodulate data.

18. The base station device according to claim 1, wherein the CRS is transmitted in at least a Physical Downlink Control Channel (PDCCH) mapped Orthogonal Frequency Division Multiplexing (OFDM) symbol area.

19. The mobile station device according to claim 5, wherein
the CRS is used to demodulate data.

20. The mobile station device according to claim 5, wherein
the CRS is transmitted in at least a Physical Downlink Control Channel (PDCCH) mapped Orthogonal Frequency Division Multiplexing (OFDM) symbol area.

21. The transmission method according to claim 9, wherein
the CRS is used to demodulate data.

22. The transmission method according to claim 9, wherein
the CRS is transmitted in at least a Physical Downlink Control Channel (PDCCH) mapped Orthogonal Frequency Division Multiplexing (OFDM) symbol area.

23. The reception method according to claim 13, wherein the CRS is used to demodulate data.

24. The reception method according to claim 13, wherein the CRS is transmitted in at least a Physical Downlink Control Channel (PDCCH) mapped Orthogonal Frequency Division Multiplexing (OFDM) symbol area.

* * * * *